(12) United States Patent
Fukui et al.

(10) Patent No.: US 9,678,248 B2
(45) Date of Patent: Jun. 13, 2017

(54) ANTIREFLECTIVE ARTICLE, IMAGE DISPLAY DEVICE, PRODUCTION MOLD FOR ANTIREFLECTIVE ARTICLE AND PRODUCTION METHOD FOR ANTIREFLECTIVE ARTICLE PRODUCTION MOLD

(71) Applicant: DAI NIPPON PRINTING CO., LTD., Tokyo (JP)

(72) Inventors: Yoshihiro Fukui, Tokyo (JP); Hironori Kamiyama, Tokyo (JP); Yuichi Miyazaki, Tokyo (JP); Takafumi Shibata, Tokyo (JP); Masafumi Tanaka, Tokyo (JP); Kazuo Matsufuji, Tokyo (JP); Nobu Masubuchi, Tokyo (JP); Yuri Shimozaki, Tokyo (JP); Youichirou Oohashi, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 183 days.

(21) Appl. No.: 14/412,181

(22) PCT Filed: Jul. 31, 2013

(86) PCT No.: PCT/JP2013/070732
§ 371 (c)(1),
(2) Date: Dec. 30, 2014

(87) PCT Pub. No.: WO2014/021376
PCT Pub. Date: Feb. 6, 2014

(65) Prior Publication Data
US 2015/0168610 A1     Jun. 18, 2015

(30) Foreign Application Priority Data

Jul. 31, 2012  (JP) .................................. 2012-169317
Mar. 28, 2013  (JP) .................................. 2013-070098
(Continued)

(51) Int. Cl.
B29C 59/02     (2006.01)
B29C 33/38     (2006.01)
(Continued)

(52) U.S. Cl.
CPC .......... G02B 1/118 (2013.01); B29C 33/3842 (2013.01); B29C 33/424 (2013.01);
(Continued)

(58) Field of Classification Search
CPC . B29C 33/424; B29C 33/3842; B29C 59/046; B29C 59/02; B29C 2059/023;
(Continued)

(56) References Cited

U.S. PATENT DOCUMENTS 4,013,465 A    3/1977  Clapham et al.
8,641,212 B2 * 2/2014  Park ....................... G02B 1/118
                                                      359/599
(Continued)

FOREIGN PATENT DOCUMENTS

JP    A-50-70040       6/1975
JP    A-2003-531962   10/2003
(Continued)

OTHER PUBLICATIONS

Oct. 8, 2013 Search Report issued in International Patent Application No. PCT/JP2013/070732.

*Primary Examiner* — Patricia L Nordmeyer
(74) *Attorney, Agent, or Firm* — Oliff PLC

(57) ABSTRACT

In order to improve the scratch resistance of an antireflective article having a moth-eye structure, an antireflective article
(Continued)

is provided that has fine protrusions densely arranged therein, and has the interval between adjacent fine protrusions being no more than the shortest wavelength in the wavelength band for antireflection. At least some of the fine protrusions are fine protrusions having a plurality of apexes.

14 Claims, 19 Drawing Sheets

(30) Foreign Application Priority Data

Mar. 28, 2013 (JP) .................................. 2013-070099
Mar. 29, 2013 (JP) .................................. 2013-072639

(51) Int. Cl.
*G02B 1/118* (2015.01)
*B29C 59/04* (2006.01)
*B29C 33/42* (2006.01)
*B29C 35/08* (2006.01)
*B29L 11/00* (2006.01)

(52) U.S. Cl.
CPC ............ *B29C 59/02* (2013.01); *B29C 59/046* (2013.01); *B29C 2035/0827* (2013.01); *B29C 2059/023* (2013.01); *B29K 2995/0072* (2013.01); *B29K 2995/0074* (2013.01); *B29L 2011/00* (2013.01); *G02F 2201/38* (2013.01); *Y10T 428/24355* (2015.01)

(58) Field of Classification Search
CPC ............. B29C 2035/0827; G02B 1/118; G02F 2201/38; B29K 2995/0074; B29K 2995/0072; Y10T 428/24355; B29L 2011/00

See application file for complete search history.

(56) References Cited

U.S. PATENT DOCUMENTS

| | | | |
|---|---|---|---|
| 9,170,350 B2 * | 10/2015 | Jeong | .................. G02B 3/02 |
| 2003/0205475 A1 | 11/2003 | Sawitowski | |
| 2006/0158972 A1 | 7/2006 | Kimura | |
| 2011/0100827 A1 * | 5/2011 | Hayashi | ............... G02B 5/0215 205/112 |
| 2012/0069443 A1 | 3/2012 | Taguchi et al. | |

FOREIGN PATENT DOCUMENTS

| | | |
|---|---|---|
| JP | A-2006-201371 | 8/2006 |
| JP | A-2007-156017 | 6/2007 |
| JP | B2-4632589 | 2/2011 |
| JP | A-2011-237469 | 11/2011 |
| JP | A-2012-14083 | 1/2012 |
| JP | A-2012-14084 | 1/2012 |
| JP | A-2012-37670 | 2/2012 |
| JP | 2014119537 A * | 6/2014 |
| WO | WO 2010/143503 A1 | 12/2010 |

* cited by examiner

ANTIREFLECTIVE ARTICLE, IMAGE DISPLAY DEVICE, PRODUCTION MOLD FOR ANTIREFLECTIVE ARTICLE AND PRODUCTION METHOD FOR ANTIREFLECTIVE ARTICLE PRODUCTION MOLD

TECHNICAL FIELD

The present invention relates to an antireflective article which prevents reflections by arranging a number of fine protrusions closely to each other at an interval no more than a shortest wavelength of a wavelength band of electromagnetic waves of which reflections are to be prevented.

BACKGROUND ART

In recent years, various methods for manufacturing an antireflective film which is a film-shaped antireflective article by arranging a number of fine protrusions closely to each other on the surface of a transparent base (transparent film) to prevent reflections have been proposed (see Patent Documents 1 to 3). These methods utilize the properties of a so-called moth-eye structure to change the refractive index to incident light continuously in a thickness distribution of a substrate to eliminate interfaces where the refractive indexes are discontinuous to thereby prevent reflections.

In an antireflective article having this moth-eye structure, fine protrusions are arranged closely to each other so that an interval d between adjacent fine protrusions is no more than a shortest wavelength Λmin of a wavelength band of electromagnetic waves of which reflections are to be prevented (d≤Λmin). Moreover, each fine protrusion is manufactured so that the fine protrusion stands vertically on the transparent base and the cross-sectional area thereof decreases (the fine protrusion is tapered) as the fine protrusion advances from the transparent base toward a distal end.

Various applications of the antireflective article have been proposed. For example, the antireflective article may be disposed on a light emission surface of various image display devices to reduce reflections of external light such as sunlight from the screen to improve visibility of images. Further, a touch panel may be formed using electrodes in which a fine protrusion group is formed on a sheet-shaped or planar transparent base and a transparent conductive film such as ITO (indium-tin oxides) on the fine protrusion group. By doing so, it is possible to prevent optical reflections between the touch panel electrodes and various members adjacent to the electrodes to suppress the occurrence of interference patterns or ghost images.

Moreover, Patent Document 4 discloses this type of antireflective articles which can secure a sufficient antireflection function even when a plurality of peaks is formed at an apex of a fine protrusion due to the resin filling defects during molding.

However, an antireflective article having this type of moth-eye structures has a problem in that the scratch resistance thereof is not sufficient for practical use. That is, for example, when another object comes into contact with the antireflective article, the anti-reflection function deteriorates in a local region, and cloudy spots, scratches, or the like appear in the contacting region, which may cause appearance defects.

Patent Document 1: Japanese Unexamined Patent Application, Publication No. S50-70040

Patent Document 2: Japanese Unexamined Patent Application (Translation of PCT Application), Publication No. 2003-531962

Patent Document 3: Japanese Patent No. 4632589

Patent Document 4: Japanese Unexamined Patent Application, Publication No. 2012-037670

DISCLOSURE OF THE INVENTION

Problems to be Solved by the Invention

The present invention has been made in view of such circumstances, and an object thereof is to improve the scratch resistance of an antireflective article having the moth-eye structure as compared to the conventional antireflective article.

Means for Solving the Problems

As the result of repeated careful examinations to solve the problems, the present inventors have conceived an ideal of forming fine protrusions (referred to as multi-peak fine protrusions) each having a plurality of peaks and have completed the present invention. In the following description, fine protrusions having only one peak will be referred to as mono-peak fine protrusions for comparison with multi-peak fine protrusions. Moreover, convex portions that form the peaks of the multi-peak fine protrusions and the mono-peak fine protrusions will be appropriately referred to as peaks.

Specifically, the present invention provides the following inventions.

(1) An antireflective article in which fine protrusions are disposed closely to each other and an interval between adjacent fine protrusions is no more than a shortest wavelength in a wavelength band of electromagnetic waves of which reflections are to be prevented, wherein at least a portion of the fine protrusions is a multi-peak fine protrusion having a plurality of peaks.

According to (1), since fine protrusions having excellent mechanical strength as compared to mono-peak fine protrusions are formed, it is possible to prevent damages to protrusions when impact is applied thereto as compared to when only mono-peak fine protrusions are formed. Due to this, it is possible to suppress local deterioration of the anti-reflection function and to suppress the occurrence of appearance defects. Moreover, even when the fine protrusions are damaged, it is possible to reduce the area of the damaged region. Due to this, it is possible to suppress local deterioration of the anti-reflection function and to suppress the occurrence of appearance defects.

(2) The antireflective article according to (1), wherein the fine protrusions have heights which vary in a standard deviation range of 10 nm or more and 50 nm or smaller.

According to (2), only tall fine protrusions among a number of fine protrusions make contact with the surface of various members disposed so as to face the antireflective article, for example. Due to this, it is possible to improve sliding properties remarkably as compared to when the antireflective article has only fine protrusions having the same height.

(3) The antireflective article according to (1) or (2), wherein when the fine protrusions are seen in a plan view from a distal end side, the multi-peak fine protrusion is split into a plurality of regions by a groove formed so as to extend outward approximately from the center of the multi-peak fine protrusion, and each of the plurality of regions is a crest associated with the peaks.

According to (3), it is possible to form the antireflective article with multi-peak fine protrusions having a more detailed shape.

(4) The antireflective article according to any one of (1) to (3), wherein a circumferential length of the multi-peak fine protrusion when the fine protrusions are seen in a plan view from a distal end side is larger than that of a mono-peak fine protrusion.

According to (4), more specifically, since the multi-peak fine protrusions are formed by a molding mold having the corresponding shape, it is possible to improve the scratch resistance more sufficiently and to improve the optical properties.

(5) The antireflective article according to any one of (1) to (4), wherein at least a portion of the fine protrusions forms an annular fine protrusion group which includes an inner fine protrusion and a plurality of outer fine protrusions which surround the inner fine protrusion and have a larger height than the inner fine protrusion.

According to (5), since the outer fine protrusions having a larger height are provided so as to surround one inner fine protrusion, when impact is applied from various members contacting the antireflective article, the plurality of outer fine protrusions absorbs the impact. Thus, it is possible to prevent the breakage of at least the one inner fine protrusion, caused by the impact and to prevent the damage to all fine protrusions in a certain range. Due to this, it is possible to suppress deterioration of the anti-reflection function in a local region and to suppress the occurrence of appearance defects.

(6) The antireflective article according to any one of (1) to (5), wherein at least a portion of the fine protrusions forms a convex protrusion group which includes one apex fine protrusion and a plurality of surrounding fine protrusions which is formed around and adjacent to the apex fine protrusion and has a smaller height than the apex fine protrusion.

According to (6), since the convex protrusion group is formed such that the plurality of surrounding fine protrusions having a smaller height is provided around and adjacent to one apex fine protrusion, when impact is applied from various members contacting the antireflective article, the impact is absorbed mainly by the apex fine protrusion. Thus, it is possible to prevent the breakage of the plurality of adjacent surrounding fine protrusions, caused by the impact and to prevent the damage to all fine protrusions in a certain range. Due to this, it is possible to suppress deterioration of the anti-reflection function in a local region and to suppress the occurrence of appearance defects.

(7) The antireflective article according to any one of (1) to (6), wherein a frequency distribution of a height of the fine protrusions has a crest of a distribution having one apex, and a larger number of the multi-peak protrusions are present near the apex than a skirt portion of the crest of the distribution.

According to (7), the frequency distribution of the height of the fine protrusions has a crest of a distribution having one apex, and a larger number of the multi-peak protrusions are present near the apex than a skirt portion of the crest of the distribution. Thus, it is possible to widen the wavelength band of the anti-reflection function of the antireflective article and to limit the optical properties from an oblique direction and to limit the viewing-angle properties.

(8) The antireflective article according to (7), wherein when an average of a height h in the frequency distribution of the height h of the fine protrusions is m and a standard deviation is σ, a region of h<m−σ is defined as a low-height region, a region of m−σ≤h≤m+σ is defined as a mid-height region, and a region of m+σ<h is defined as a high-height region, a ratio of the number Nm of multi-peak fine protrusions in respective regions to a total number Nt of fine protrusions in the entire frequency distribution satisfies relations of:

Nm/Nt in the mid-height region>Nm/Nt in the low-height region; and

Nm/Nt in the mid-height region>Nm/Nt in the high-height region. According to (8), the ratio (Nm/Nt) of the number (Nm) of multi-peak fine protrusions in the mid-height region to the total number (Nt) of fine protrusions in the entire frequency distribution is larger than the ratio (Nm/Nt) of the number (Nm) of multi-peak fine protrusions in the low-height region or the high-height region to the total number (Nt) of fine protrusions in the entire frequency distribution. Thus, it is possible to widen the wavelength band of the anti-reflection function of the antireflective article and to limit the viewing-angle properties in more detail.

(9) The antireflective article according to any one of (1) to (6), wherein a frequency distribution of a height of the fine protrusions includes a plurality of crests of distributions, and a larger number of the multi-peak protrusions is present near an apex than a skirt portion of the crest of each distribution.

According to (9), the frequency distribution of the height of the fine protrusions includes a plurality of crests of distributions, and a larger number of the multi-peak protrusions is present near the apex than the skirt portion of the crest of each distribution. Thus, it is possible to widen the wavelength band of the anti-reflection function of the anti-reflective article and to improve the optical properties from an oblique direction and to improve the viewing-angle properties.

(10) The antireflective article according to (9), wherein the frequency distribution of a height h of the fine protrusions has a double-peak distribution, when a height serving as a boundary between the crests of the distribution is hs, an average of the height h of the fine protrusions in the crest of a distribution smaller than hs is m1, and a standard deviation is σ1, a region of h<m1−σ1 is defined as a low-height region, a region of m1−σ1≤h≤m1+σ1 is defined as a mid-height region, and a region of m1+σ1<h<hs is defined as a high-height region, a ratio of the number Nm1 of multi-peak protrusions in the respective regions of the crest of the distribution smaller than hs to a total number Nt of fine protrusions in the entire frequency distribution satisfies relations of:

Nm1/Nt in the mid-height region>Nm1/Nt in the low-height region; and

Nm1/Nt in the mid-height region>Nm1/Nt in the high-height region, and when an average of the height h of the fine protrusions in the crest of a distribution of hs or more is m2 and a standard deviation is σ2, a region of hs<h<m2−σ2 is defined as a low-height region, a region of m2−σ2≤h≤m2+σ2 is defined as a mid-height region, and a region of m2+σ2<h is defined as a high-height region, a ratio of the number Nm2 of multi-peak protrusions in respective regions of the crest of the distribution of hs or more to a total number Nt of fine protrusions in the entire frequency distribution satisfies relations of:

Nm2/Nt in the mid-height region>Nm2/Nt in the low-height region; and

Nm2/Nt in the mid-height region>Nm2/Nt in the high-height region.

According to (10), the ratio (Nm/Nt) of the number (Nm) of multi-peak fine protrusions in the mid-height region to the total number (Nt) of fine protrusions in the entire frequency distribution is larger than the ratio (Nm/Nt) of the number (Nm) of multi-peak fine protrusions in the low-height region or the high-height region to the total number (Nt) of fine protrusions in the entire frequency distribution. Thus, it is possible to widen the wavelength band of the anti-reflection function of the antireflective article in more detail.

(11) The antireflective article according to (9) or (10), wherein when an average of a height h in the frequency distribution of the height h of the fine protrusions is m and a standard deviation is σ, a region of h<m−σ is defined as a low-height region, a region of m−σ≤h≤m+σ is defined as a mid-height region, and a region of m+σ<h is defined as a high-height region, a ratio of the number Nm of multi-peak protrusions in respective regions to a total number Nt of fine protrusions in the entire frequency distribution satisfies relations of:

Nm/Nt in the mid-height region>Nm/Nt in the low-height region; and

Nm/Nt in the mid-height region>Nm/Nt in the high-height region.

According to (11), it is possible to realize the effect of improving the optical properties from the oblique direction and improving wide-viewing angle properties and to realize the anti-reflection function in a wider wavelength band in more detailed manner.

(12) An image display device in which the antireflective article according to any one of (1) to (11) is disposed on a light emission surface of an image display panel.

According to (12), it is possible to provide an image display device including the antireflective article having improved scratch resistance and various other properties.

(13) An antireflective article production mold provided for producing an antireflective article in which, fine protrusions are disposed closely to each other, an interval between adjacent fine protrusions is no more than a shortest wavelength in a wavelength band of electromagnetic waves of which reflections are to be prevented, and at least a portion of the fine protrusions is a multi-peak fine protrusion having a plurality of peaks, wherein the antireflective article production mold is produced so that micro-pores corresponding to the fine protrusions are arranged closely to each other.

According to (13), in the antireflective article produced using the mold, since fine protrusions having excellent mechanical strength as compared to mono-peak fine protrusions are formed in the antireflective article, it is possible to prevent damages to protrusions when impact is applied to the antireflective article as compared to when only mono-peak fine protrusions are formed. Due to this, it is possible to suppress local deterioration of the anti-reflection function and to suppress the occurrence of appearance defects. Moreover, even when the fine protrusions are damaged, it is possible to reduce the area of the damaged region. Due to this, it is possible to suppress local deterioration of the anti-reflection function and to suppress the occurrence of appearance defects.

(14) A production method for producing the antireflective article production mold according to (13), the method comprising:

a flat micro-pore forming step of applying a first voltage to execute anodization and then executing etching to form micro-pores having an approximately flat bottom surface on a surface of a plate; and a multi-peak protrusion micro-pore forming step of applying a second voltage lower than the first voltage to execute anodization and then executing etching to form a plurality of micro-pores on the bottom surface of the micro-pores having the approximately flat bottom surface.

According to (14), the flat micro-pore forming step involves forming micro-pores having an approximately flat bottom surface on a surface of a plate and the multi-peak protrusion micro-pore forming step involves forming a plurality of micro-pores on the bottom surface of the micro-pores having the approximately flat bottom surface. Thus, it is possible to produce a production mold for an antireflective article in which multi-peak fine protrusions are present in a predetermined distribution.

EXPLANATION OF REFERENCE NUMERALS

1: Antireflective article
2: Base
4: Ultraviolet-curable resin layer (Receiving layer)
5, 5A, 5B: Fine protrusion
6: Uneven surface
10: Production step
12: Die
13: Roll plate
14, 15: Roller
g: Groove

PREFERRED MODE FOR CARRYING OUT THE INVENTION

[First Embodiment]

Figure 1:
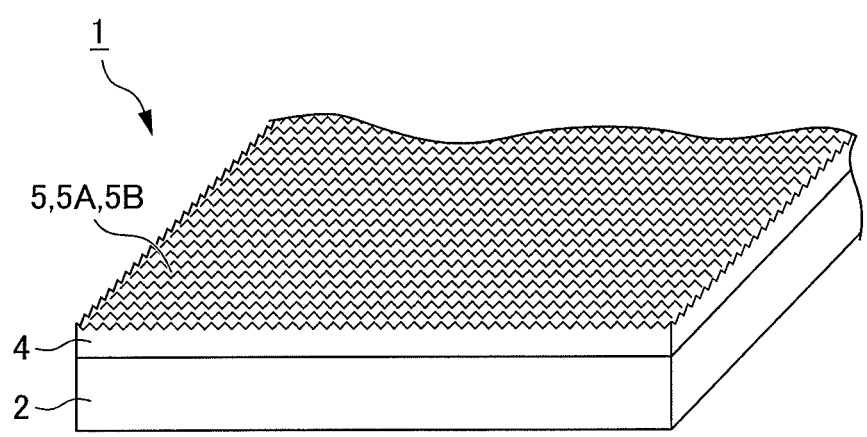
FIG. 1 is a schematic perspective view illustrating an antireflective article according to a first embodiment of the present invention.

FIG. 1 is a diagram (schematic perspective view) illustrating an antireflective article according to a first embodiment of the present invention. The antireflective article 1 is an antireflective film that is generally formed in a film shape. In an image display device according to the present embodiment, the antireflective article 1 is held by being attached to a front surface of an image display panel, and reflections of external light such as sunlight or lamp light from the screen are suppressed by the antireflective article 1 to improve visibility. The shape of the antireflective article is not limited to a flat film shape, but the antireflective article may be formed in a flat sheet shape or a flat plate shape (the shapes are referred to as film, sheet, and plate shapes in ascending order of the relative thicknesses). Moreover, the film shape, the sheet shape, and the plate shape may have a curved shape or a stereoscopic shape instead of the flat shape. Furthermore, antireflective articles having the stereoscopic shapes of various lenses and various prisms may be appropriately employed according to the applications.

Here, the antireflective article 1 is manufactured by arranging a number of fine protrusions closely to each other on the surface of a base 2 which is a transparent film. The plurality of fine protrusions arranged closely to each other is collectively referred to as a fine protrusion group. Here, various resin films can be used as the base 2, and examples of the resin include cellulose (fibrin) resins such as triacetylcellulose (TAC), acrylic resins such as polymethyl methacrylate (PMMA), polyester resins such as polyethylene terephthalate (PET), polyolefin resins such as polypropylene (PP), vinyl resins such as polyvinyl chloride (PVC), and transparent resins such as polycarbonate (PC). As described above, the shape of the antireflective article is not limited to the film shape and various other shapes can be employed. Thus, the base 2 may be formed, for example, of glass such as soda glass, potash glass, or lead glass, ceramics such as PLZT, and various transparent inorganic materials such as quartz and fluorite, other than these materials according to the shape of the antireflective article.

In the antireflective article 1, a non-cured resin layer (hereinafter appropriately referred to as a receiving layer) 4 which serves as a receiving layer having a micro-uneven shape, formed from a fine protrusion group is formed on the base 2, and the receiving layer 4 is molded and cured, whereby fine protrusions are arranged closely to each other on the surface of the base 2. In the present embodiment, an acrylate-based ultraviolet-curable resin which is one of molding resins provided for molding is employed as the receiving layer 4, and an ultraviolet-curable resin layer 4 is formed on the base 2. The antireflective article 1 is manufactured so that the refractive index changes gradually in the thickness distribution with the aid of the uneven shape created by the fine protrusions so as to suppress reflections of incident light in a wide wavelength range with the aid of the properties of a moth-eye structure.

[Inter-Adjacent Protrusion Distance]

In this way, the fine protrusions manufactured in the antireflective article 1 are arranged so that the interval d between adjacent fine protrusions is no more than a shortest wavelength Λmin of a wavelength band of electromagnetic waves of which reflections are to be prevented (d≤Λmin). In the present embodiment, since the antireflective article is mainly aimed to be disposed on an information processing device to improve the visibility, the shortest wavelength is set to the shortest wavelength (380 nm) of a visible light region by taking individual differences and watching conditions into consideration and the interval d is set to 100 nm to 300 nm by taking variations into consideration. Moreover, the adjacent fine protrusions associated with the interval d are so-called neighboring fine protrusions and are protrusions which are in contact with the skirt portions of fine protrusions which are the root portions close to the base 2. In the antireflective article 1, since the fine protrusions are arranged closely to each other, when lines are created so as to follow the trough portions between fine protrusions sequentially, a net-like pattern obtained by connecting a number of polygonal regions surrounding the respective fine protrusions is created. The adjacent fine protrusions associated with the interval d are protrusions that share a partial line that constitutes the net-like pattern.

More specifically, the fine protrusions are defined as follows. According to anti-reflection techniques based on the moth-eye structure, an effective refractive index at an interface between a transparent base surface and a medium adjacent to the surface is changed continuously in the thickness distribution to prevent reflections. Thus, the fine protrusions need to satisfy predetermined conditions. As for the interval of protrusions which is one of the conditions, as disclosed in Japanese Unexamined Patent Application, Publication No. S50-70040, Japanese Patent No. 4632589, and the like, for example, when fine protrusions are arranged regularly at a predetermined period, the interval d between adjacent fine protrusions is the period P (d=P). Due to this, when the longest wavelength and the shortest wavelength of a visible wavelength band are λmax and Λmin, respectively, the minimum condition required for achieving an anti-reflection effect in the longest wavelength of the visible wavelength band is Λmin=λmax, and thus, P≤λmax. Thus, the minimum condition required for achieving the anti-reflection effect in all wavelengths of the visible wavelength band is Λmin=λmin, and thus, P≤λmin.

Although the wavelengths λmax and λmin may vary depending on observation conditions, light intensity (brightness), individual differences, and the like, the wavelengths are typically set such that λmax=780 nm and λmin=380 nm. Due to this, a preferred condition for achieving the anti-reflection effect more reliably in all wavelengths of the visible wavelength band is d≤300 nm, and a more preferred condition is d<200 nm from the perspective of suppressing cloudiness when seen in an oblique direction (a direction of 45° or more with respect to the normal to the surface of the base 2). In order to achieve the anti-reflection effect and secure isotropy of reflectance (low angular dependence), the lower limit of the period d is generally set to d≥50 nm, and preferably, d≥100 nm. In contrast, the height H of a protrusion is set to H≥0.2×λmax=156 nm (when λmax=780 nm) from the perspective of achieving a sufficient anti-reflection effect.

Figure 2:
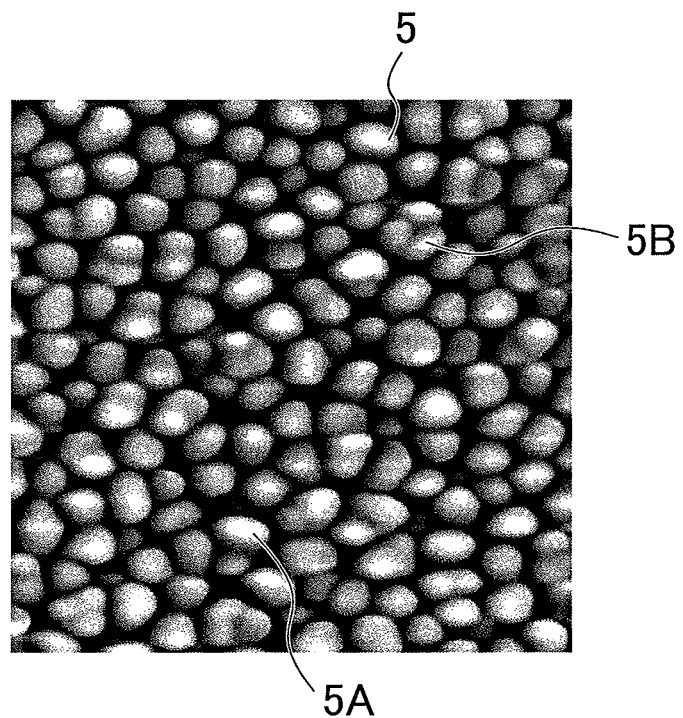
FIG. 2 a diagram provided for describing adjacent protrusions.

However, as in the present embodiment, when the fine protrusions are arranged irregularly, the interval d between adjacent fine protrusions may vary. More specifically, as illustrated in FIG. 2, in a plan view when seen in a direction normal to the front or rear surface of a base, when fine protrusions are not arranged regularly at a predetermined period, it may be unable to define the interval d between adjacent protrusions depending on a repetition period P of the protrusions and even the concept of adjacent protrusions becomes ambiguous. Thus, in such a case, the interval is calculated in the following manner.

(1) First, an in-plane arrangement (plan-view shape of a protrusion arrangement) of protrusions is detected using an atomic force microscope (AFM) or a scanning electron microscope (SEM). FIG. 2 is an enlarged picture obtained by an AFM.

Figure 3:
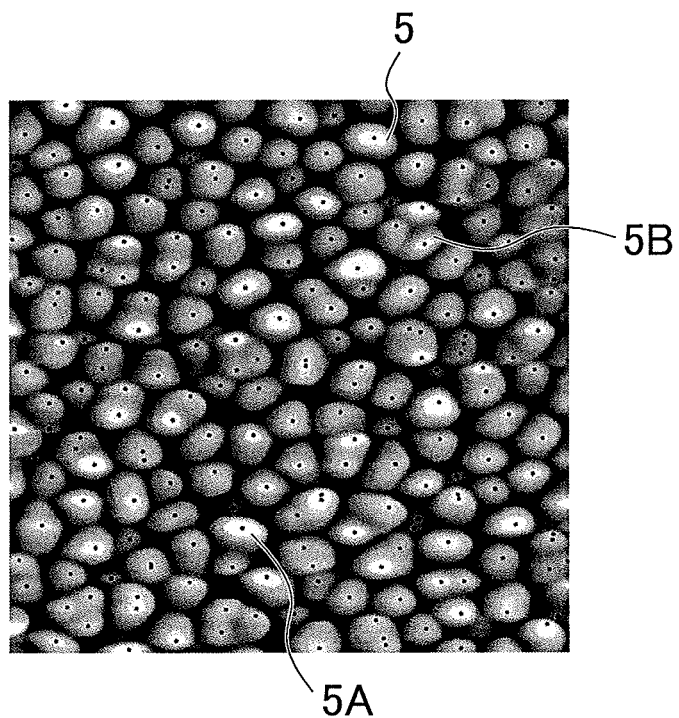
FIG. 3 is a diagram provided for describing maximum points.

(2) Subsequently, the maximum height points (hereinafter referred to simply as maximum points) of respective protrusions are detected from the obtained in-plane arrangement. Various methods can be used as a method of obtaining the maximum points. Examples of the method include (a) a method of sequentially comparing plane coordinates on the enlarged picture of the plan-view shape with height data obtained from the corresponding cross-sectional shape to obtain the maximum points and (b) a method of creating a 2-dimensional image from the data of a height distribution in plane coordinates on the base obtained by the AFM to obtain an enlarged plan-view picture and processing the enlarged plan-view picture to obtain the maximum points. FIG. 2 is an enlarged picture obtained by an AFM (in which an image density corresponds to a height), and FIG. 3 is a diagram illustrating the detection results of maximum points obtained by processing the image data of the enlarged picture illustrated in FIG. 2, in which black dots are the maximum points of protrusions. In this processing, the image data was processed using a Gaussian low-pass filter which uses 4.5 by 4.5 pixels to prevent detections errors in the maximum point caused by noise. Moreover, the image data was sequentially scanned by a maximum point detection filter which uses 8 by 8 pixels to obtain maximum points at intervals of 1 nm (=1 pixel).

Figure 4:
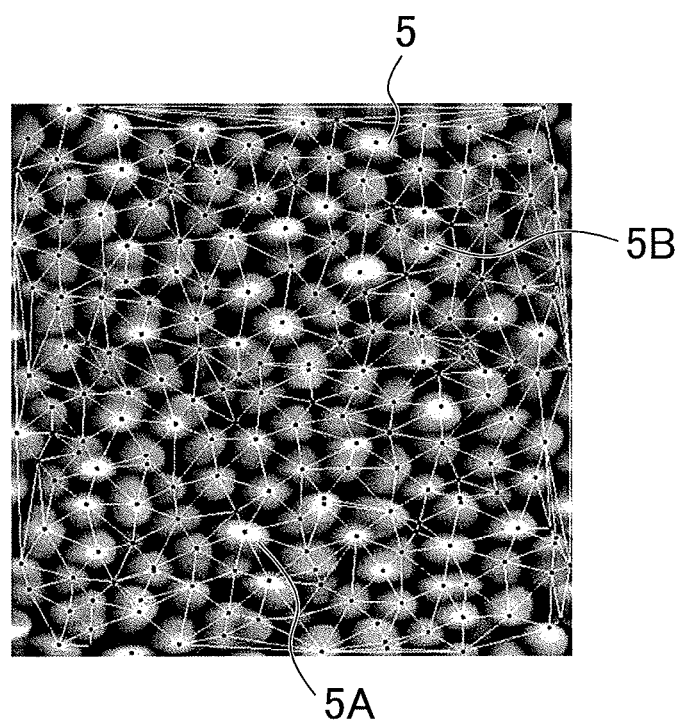
FIG. 4 is a diagram illustrating a Delaunay diagram.

(3) Subsequently, a Delaunay diagram which uses the detected maximum points as generating points is created. Here, the Delaunay diagram is a net-like figure made up of a cluster of triangles obtained by applying Voronoi tessellation using the maximum points as generating points, defining generating points to which Voronoi cells are adjacent as adjacent generating point, and connecting the adjacent generating points by lines. Each triangle is called a Delaunay triangle, and each side (the line that connects the adjacent generating points) of the triangle is called a Delaunay line. FIG. 4 is a diagram in which the Delaunay diagram (the diagram depicted by white lines) obtained from FIG. 3 is superimposed on the original image of FIG. 3. The Delaunay diagram is in a reciprocal relation with the Voronoi diagram. Moreover, the Voronoi tessellation means dividing a plane into net-like figures made up of a cluster of closed polygons that are defined by perpendicular bisectors of the lines that connect the respective adjacent generating points. The net-like figures obtained by Voronoi tessellation are a Voronoi diagram, and each closed region is a Voronoi cell.

Figure 5:
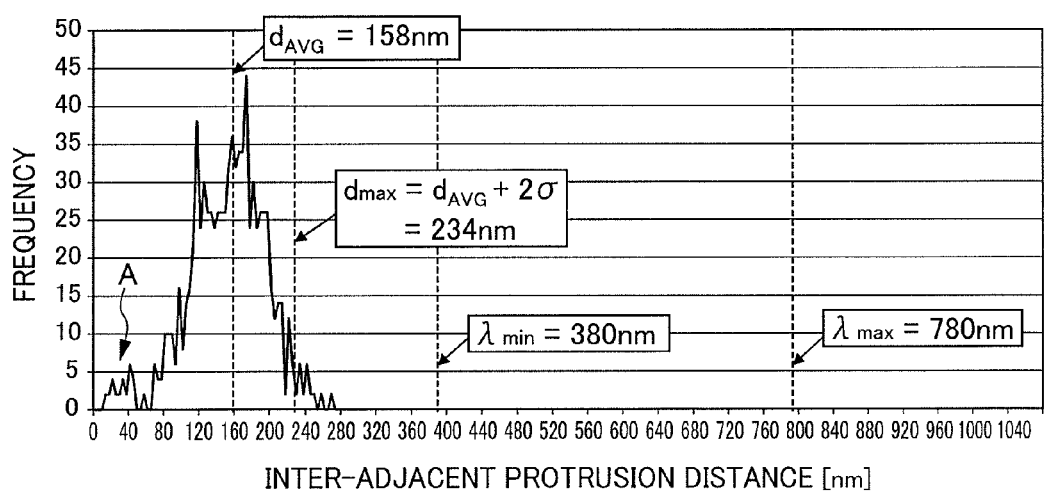
FIG. 5 is a frequency distribution diagram provided for measuring an inter-adjacent protrusion distance.

(4) Subsequently, a frequency distribution of the line lengths of the respective Delaunay lines (that is, a frequency distribution of the distance (hereinafter referred to an inter-adjacent protrusion distance) between the adjacent maximum points) is calculated. FIG. 5 is a histogram of the frequency distribution created from the Delaunay diagram of FIG. 4. As illustrated in FIG. 2 and FIGS. 11A to 11C, when concave portions such as grooves are present in the apex of a protrusion or the apex is split into a plurality of crests, data associated with a microscopic structure in which a concave portion is present in the apex of the protrusion and data associated with a microscopic structure in which the apex is split into a plurality of crests are eliminated from the obtained frequency distribution to extract the data associated with the protrusions themselves. In this way, a frequency distribution associated with the protrusions themselves is created.

Specifically, in the microscopic structure in which a concave portion is resent in the apex of the protrusion and the microscopic structure associated with a multi-peak fine protrusion in which the apex is split into a plurality of crests, an inter-adjacent maximum point distance is remarkably different from a range of numerical values of mono-peak fine protrusions which do not have such a microscopic structure. Due to this, the data of protrusions themselves is extracted by eliminating the corresponding data using this feature to detect the frequency distribution. More specifically, approximately five to twenty adjacent mono-peak fine protrusions are selected from the enlarged plan-view picture of a fine protrusion (group) illustrated in FIG. 2, for example, the values of the inter-adjacent maximum point distances are extracted as samples, and values (generally, data of which the value is no more than an average inter-adjacent maximum point distance obtained from the samples) that obviously deviate from the numerical range obtained from the samples are eliminated to detect the frequency distribution. In the example of FIG. 5, the data (small peaks at the left end indicated by arrow A) of which the inter-adjacent maximum point distance is no more than 56 nm is eliminated. FIG. 5 illustrates a frequency distribution before such an elimination process is applied. Such an elimination process may be executed by setting the maximum point detection filter.

(5) An average $d_{AVG}$ and a standard deviation $\sigma$ are calculated from the frequency distribution of the inter-adjacent protrusion distance d calculated in this manner. Here, when the average $d_{AVG}$ and the standard deviation $\sigma$ are calculated by regarding the frequency distribution obtained in this manner as a normal distribution, the average $d_{AVG}$=158 nm and the standard deviation $\sigma$=38 nm in the example of FIG. 5. Due to this, the maximum value of the inter-adjacent protrusion distance d is set to dmax=$d_{AVG}$+2$\sigma$, and in this example, dmax=234 nm.

Figure 6:
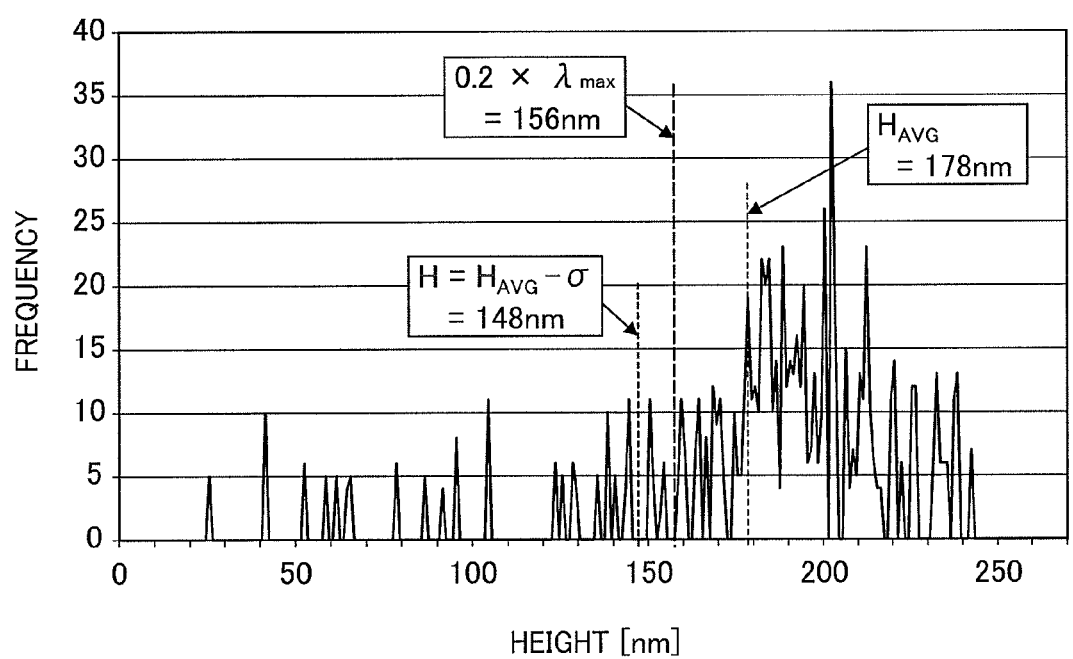
FIG. 6 is a frequency distribution diagram provided for describing a very small height.

The height of the protrusion is defined according to the same method. In this case, a difference between relative heights of respective maximum point positions from a specific reference position is acquired from the maximum points obtained in (2) to create a histogram. FIG. 6 is a diagram illustrating a histogram of the frequency distribution of a protrusion height H using the root position of a protrusion as a reference (height 0), obtained in this manner. An average $H_{AVG}$ and a standard deviation a of protrusion heights are calculated from the frequency distribution histogram. Here, in the example of FIG. 6, the average $H_{AVG}$=178 nm and the standard deviation $\sigma$=30 nm. Due to this, in this example, the protrusion heights have an average $H_{AVG}$=178 nm. In the histogram of the protrusion height H illustrated in FIG. 6, a multi-peak fine protrusion has a plurality of peaks, and one protrusion has a plurality of items of data. Thus, in this case, the frequency distribution is calculated by employing a highest peak among the plurality of peaks of which the feet belong to the same fine protrusion as a protrusion height of the fine protrusion.

Figure 7:
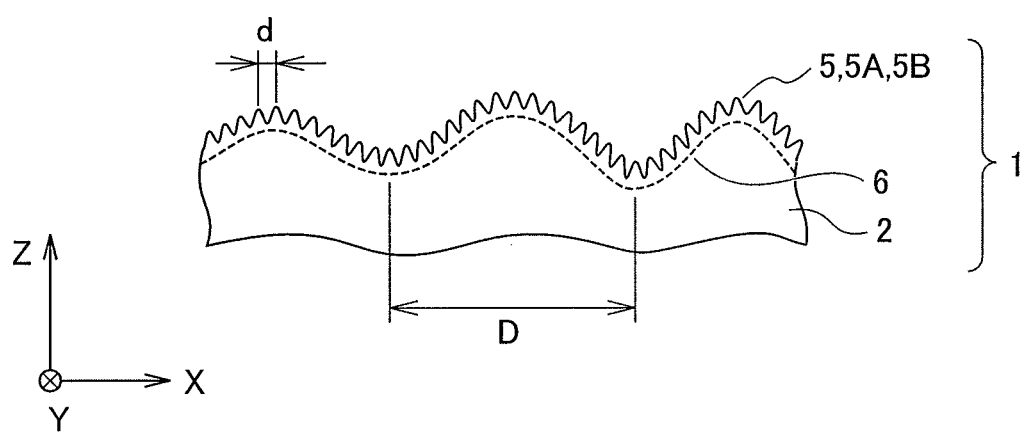
FIG. 7 is a conceptual cross-sectional view illustrating the profile indicating an uneven surface (undulation) of an envelope surface of the trough bottoms of fine protrusions.

The reference position used when measuring the protrusion height is set such that a trough bottom (a minimum height point) between adjacent fine protrusions is the reference of the height 0. However, when the height itself of the trough bottom varies depending on a position (for example, as will be described in FIG. 7, the height of the trough bottom has an undulation having a larger cycle than the inter-adjacent protrusion distance of fine protrusions), the protrusion height is calculated in the following manner. (1) First, an average of the heights of respective trough bottoms measured from the front or rear surface of the base 2 is calculated among surfaces where the averages converge sufficiently. (2) Subsequently, a surface which has the average height and which is parallel to the front or rear surface of the base 2 is selected as a reference surface. (3) After that, the heights of respective fine protrusions from the reference surface are calculated again using the reference surface as the height 0.

When protrusions are arranged irregularly, the maximum value $dmax=d_{AVG}+2\sigma$ of the inter-adjacent protrusion distances and the average $H_{AVG}$ of the protrusion heights calculated in this manner need to satisfy the conditions when the protrusions are arranged regularly. Specifically, the condition of the inter-fine protrusion distance for achieving the anti-reflection effect is $dmax \leq \Lambda min$. Since the minimum condition required for achieving the anti-reflection effect in the longest wavelength of the visible wavelength band is $\Lambda min=\lambda max$, $dmax \leq \lambda max$. Thus, since the minimum condition required for achieving the anti-reflection effect in all wavelengths of the visible wavelength band is $\Lambda min=\lambda min$, $dmax \leq \lambda min$. Moreover, a preferred condition for achieving the anti-reflection effect more reliably in all wavelengths of the visible wavelength band is $dmax \leq 300$ nm, and a more preferred condition is $dmax \leq 200$ nm. Further, in order to achieve the anti-reflection effect and secure isotropy of reflectance (low angular dependence), $d \geq 50$ nm, and preferably, $d \geq 100$ nm. Moreover, the protrusion height is set to $H \geq 0.2 \times \lambda max=156$ nm (when $\lambda max=780$ nm) in order to achieve a sufficient anti-reflection effect.

Referring to the example of FIG. 2 to FIG. 6, dmax=234 nm$\leq \lambda max$=780 nm, and the condition of $dmax \leq \lambda max$ is satisfied. Thus, it is possible to achieve a sufficient anti-reflection effect. Moreover, since the shortest wavelength $\lambda min$ of the visible wavelength band is 380 nm, the minimum condition, $dmax \leq \lambda min$, for achieving an anti-reflection effect in the entire wavelength band of the visible light is satisfied. Moreover, since the average protrusion height $H_{AVG}$=178 nm, the average protrusion height $H_{AVG} \geq 0.2 \times \lambda max$=156 nm (when the longest wavelength of the wavelength band of the visible light is 780 nm), the condition of the protrusion height for achieving a sufficient anti-reflection effect is also satisfied. Since the standard deviation $\sigma$=30 nm, a relation of $H_{AVG}-\sigma$=148 nm<$0.2 \times \lambda max$=156 nm is satisfied. Thus, statistically, 50% or more and 84% or less of all protrusions satisfy the condition (no less than 178 nm) associated with the protrusion height. From the observation results of AFM and SEM and the analysis results of the fine protrusion height distribution, it is found that multi-peak fine protrusions are more likely to appear in tall fine protrusions than short fine protrusions.

[Production Steps]

Figure 8:
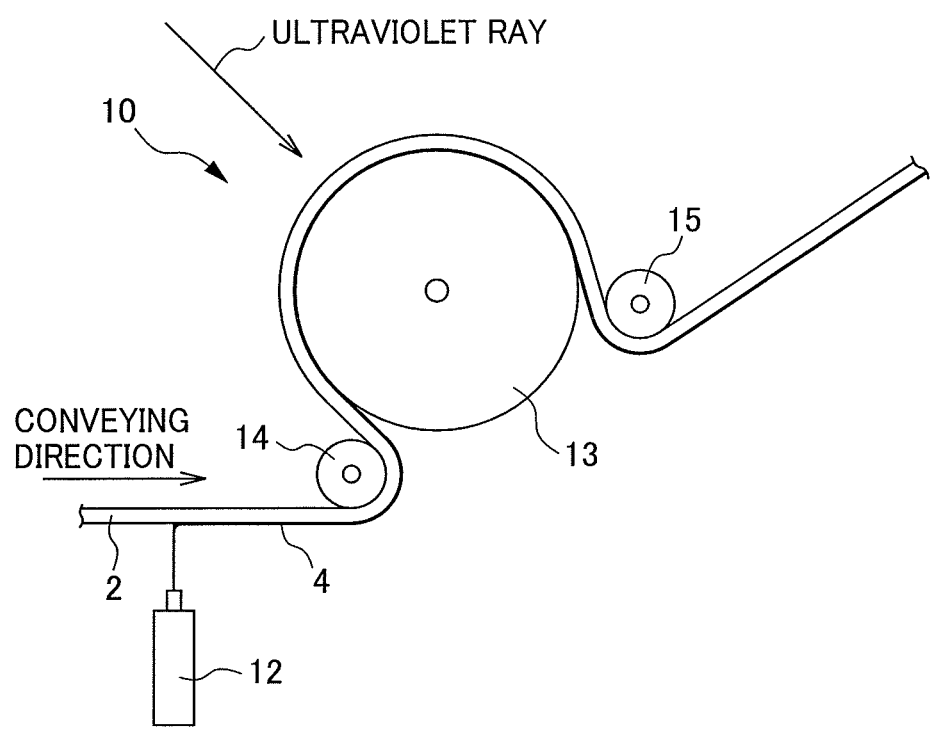
FIG. 8 is a diagram illustrating the steps of producing the antireflective article of FIG. 1.

FIG. 8 is a diagram illustrating the steps of producing the antireflective article 1. This production step 10 includes a resin supplying step of applying a non-cured and liquid ultraviolet-curable resin that forms a fine protrusion-shaped receiving layer to the band-shaped base film 2 using a die 12. A method of applying the ultraviolet-curable resin is not limited to a method which uses the die 12, and various other methods can be used. Subsequently, this production step 10 involves pressing the base 2 against a circumferential surface of a roll plate 13 which is a mold for molding the antireflective article using a pressure roller 14 so that the non-cured and liquid acrylate-based ultraviolet-curable resin adheres to the base 2 and the ultraviolet-curable resin is sufficiently filled in concave portions having a micro-relief shape created on the circumferential surface of the roll plate 13. This production step also involves curing the ultraviolet-curable resin by irradiation of ultraviolet rays in this state to create a fine protrusion group on the surface of the base 2. Subsequently, this production step involves releasing the base 2 and the cured ultraviolet-curable resin from the roll plate 13 with the aid of a release roller 15. The production step 10 involves forming an adhesion layer or the like on the base 2 as necessary, and then, cut the base 2 in a desired size to manufacture the antireflective article 1. In this way, a large number of antireflective articles 1 are produced efficiently by sequentially molding the micro-relief shape formed on the circumferential surface of the roll plate 13 to the long base roll 2.

Figure 9:
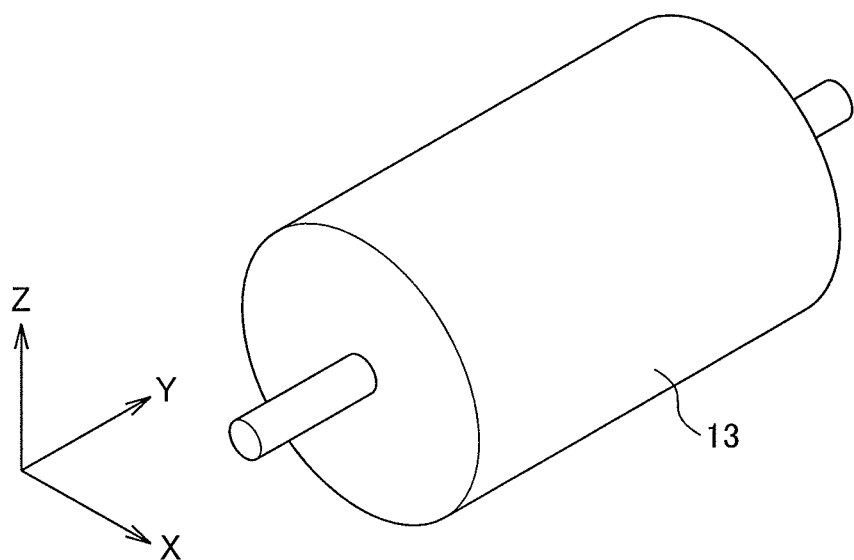
FIG. 9 is a diagram illustrating a roll plate according to the antireflective article of FIG. 1.

FIG. 9 is a perspective view illustrating a configuration of the roll plate 13. A micro-relief shape is formed on the circumferential surface of a cylindrical metallic base member of the roll plate 13 by repeating anodization and etching, and the micro-relief shape is molded to the base 2 as described above. Thus, a columnar or cylindrical member in which a high-purity aluminum layer is formed at least on the circumferential surface is used as the base member. More specifically, in the present embodiment, a hollow stainless pipe is used as the base member, and a high-purity aluminum layer is formed directly on the base member or with various intermediate layers interposed. Pipe members made from copper or aluminum may be used instead of the stainless pipe. Micro-pores are formed closely to each other on the circumferential surface of the base member of the roll plate 13 by repeating anodization and etching, the micro-pores are bored further, and the diameter of the micro-pores is gradually increased so that the diameter increases as the pore approaches the opening, whereby a relief shape is formed. As a result, micro-pores of which the diameter decreases gradually in a depth direction are formed closely to each other in the roll plate 13, and a micro-relief shape is formed in the antireflective article 1 by a number of fine protrusions of which the diameter decreases gradually as the protrusion approaches the apex so as to correspond to the micro-pores. In this case, the purity (impurity amount) and the crystal grain size of the aluminum layer and the conditions for anodization and/or etching are appropriately adjusted, whereby the fine protrusion shape unique to the present invention is obtained.

[Anodization and Etching]

Figure 10:
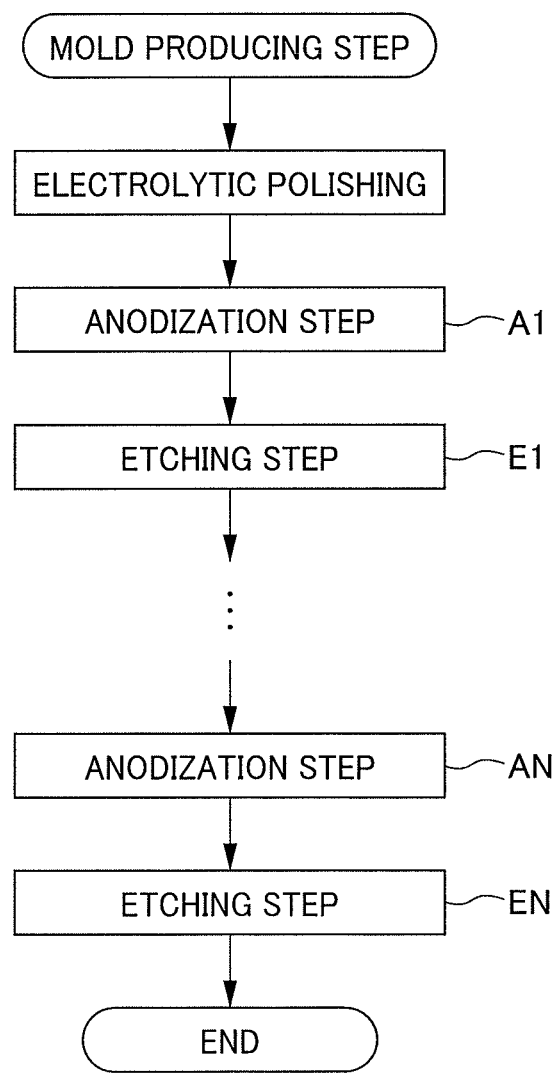
FIG. 10 is a diagram illustrating the steps of manufacturing the roll plate of FIG. 9.

FIG. 10 is a diagram illustrating the steps of producing the roll plate 13. This production step involves subjecting the circumferential surface of the base member to super-mirror finishing according to a combined electrolytic polishing method which is a combination of an electrolytic elution action and an abrasion action of abrasive grains (electrolytic polishing). Subsequently, this step involves sputtering aluminum onto the circumferential surface of the base member to form a high-purity aluminum layer. Subsequently, this step involves alternately repeating anodization steps A1, . . . , and AN and etching steps E1, . . . , and EN to process the base member to manufacture the roll plate 13.

In this production step, the anodization steps A1, . . . , and AN involve creating micro-pores in the circumferential surface of the base member according to an anodization method and further boring the created micro-pores. Here, in the anodization step, a wide range of various methods applied to anodization of aluminum can be applied as in the case where a carbon rod, a stainless plate, and the like are used for the cathode, for example. Moreover, various neutral and acid solutions can be used for a dissolving solution, and specific examples thereof include sulfuric acid solution, an oxalic acid solution, and phosphoric acid solution. In the production steps A1, . . . , and AN, a solution temperature, an application voltage, an anodization period, and the like are controlled so as to form the micro-pores in an intended depth and a shape corresponding to the fine protrusion shape.

In the subsequent etching steps E1, . . . , and EN, a mold is immersed into an etching solution to enlarge the diameter of the micro-pores created and bored in the anodization steps A1, . . . , and AN to shape the micro-pores so that the diameter decreases smoothly and gradually in the depth direction. A wide range of various etching solutions applied to this type of treatment can be applied as the etching solution, and specific examples thereof include sulfuric acid solution, an oxalic acid solution, and phosphoric acid solution. In this way, in this production steps, anodization and etching treatments are alternately executed in a plurality of numbers of time, whereby micro-pores provided for molding are created on the circumferential surface of the base member. When an anodization treatment solution itself such as the oxalic acid solution used for the anodization treatment also functions as an etching solution when the solution is brought into contact with the base member without applying a voltage. Thus, the same solution may be used for the anodization treatment solution and the etching solution, the anodization treatment may be performed by applying a predetermined voltage for a predetermined period sequentially in a state where the base member is immersed in a tank storing the solution, and the etching may be performed by immersing the base member in the tank for a predetermined period with no voltage applied.

[Improvement in Scratch Resistance]

When micro-pores were created by alternately repeating anodization and etching to create the antireflective article, a sign of room for improvement in the scratch resistance was observed. Thus, the antireflective article was observed in detail. As in the conventional antireflective articles of this type, when the antireflective article was manufactured such that fine protrusions are made up of mono-peak fine protrusions each having only one peak like a pyramidal shape or a paraboloidal shape and the peaks have the same height, the shape of a wide range of fine protrusions was damaged uniformly when another object comes into contact with the antireflective article. Due to this, the anti-reflection function deteriorated in a local region, and cloudy spots, scratches, or the like appears in the contacting region, which caused appearance defects. However, when the production conditions of the roll plate were changed, such scratch resistance was improved.

When the surface shape of the antireflective article of which the scratch resistance was improved was observed using an atomic force microscope (AFM) and a scanning electron microscope (SEM), multi-peak fine protrusions having a plurality of peaks were found among a number of fine protrusions. Here, although various types of microscopes may be provided for observing the microscopic shape, AFM and SEM are suitable for observing the surface shape of the antireflective article without damaging the microscopic structure.

Here, the multi-peak fine protrusions are formed such that rather than having a plurality of peaks, the fine protrusion is divided into a plurality of regions by grooves formed in a radial form so as to extend outward approximately from the center when the fine protrusion is seen in a plan view from the distal end side, and each of the plurality of regions becomes a crest associated with the peak. Moreover, the multi-peak fine protrusions are created by molding micro-pores having the corresponding shape, and the micro-pores associated with the multi-peak fine protrusions are integrally formed very closely to each other by repeating anodization and etching. Due to this, the multi-peak fine protrusions are formed such that the circumferential length when the fine protrusion is seen in a plan view from the distal end side is longer than that of the mono-peak fine protrusions. This can be understood from FIG. 12 described later. The shape of these multi-peak fine protrusions has different features from those of the multi-peak fine protrusions caused by resin filling defects during molding disclosed in Japanese Unexamined Patent Application, Publication No. 2012-037670.

Figure 11A:
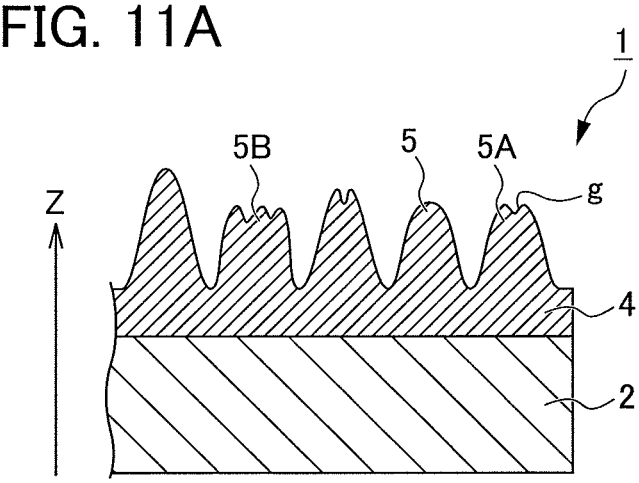
FIGS. 11A to 11C are diagrams provided for describing fine protrusions.
Figure 11B:
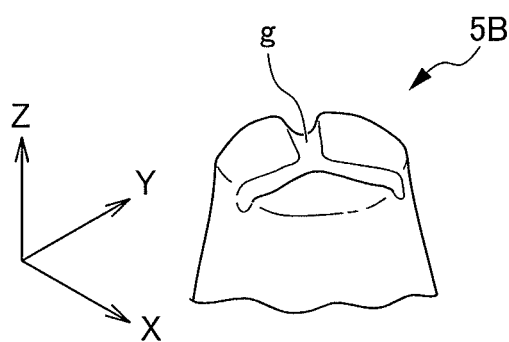
Figure 11C:
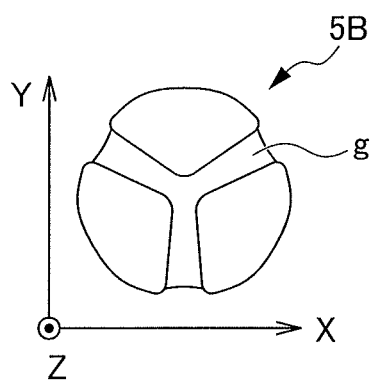

FIGS. 11A to 11C are a cross-sectional view, a perspective view, and a plan view provided for describing a multi-peak fine protrusion having a plurality of peaks. FIGS. 11A to 11C are diagrams illustrated schematically for better understanding of the present invention, and FIG. 11A illustrates a cross-section by lines connecting the peaks of successive fine protrusions. In FIGS. 11B and 11C, the xy direction is an in-plane direction of the base 2 and the z direction is a height direction of the fine protrusion. In the antireflective article 1, most fine protrusions 5 are formed so as to have one peak such that the cross-sectional area thereof (the cross-sectional area of a surface (the surface parallel to the XY plane in FIGS. 11A to 11C) orthogonal to the height direction) decreases gradually as the protrusion extends from the base 2 toward the peak. However, among the fine protrusions, grooves g were formed in the distal end portion as if a plurality of fine protrusions was connected, and fine protrusions having two peaks (5A), three peaks (5B), and four or more peaks (not illustrated) were present. The shape of the mono-peak fine protrusion 5 can be approximated to a round shape of an apex like a paraboloidal shape or a sharp shape of a peak like a cone. On the other hand, the shape of the multi-peak fine protrusions 5A and 5B is approximated to such a shape that groove-shaped concave portions are formed near the apex of the mono-peak fine protrusion 5 to divide the apex into a plurality of crests. Alternatively, the multi-peak fine protrusions 5A and 5B have such a shape that has a plurality of crest and the shape of a vertical cross-section when cut by an imaginary cutting plane including the height direction (the Z-axis direction in FIGS. 11A to 11C) is approximated to an algebraic curve $Z=a_2X^2+a_4X^4+ \ldots +a_{2n}X^{2n}+ \ldots$ which has a plurality of maximum points and which is convex near the maximum points. Here, n is a natural number and a1, a2, . . . are appropriate coefficients.

In such a multi-peak fine protrusion having a plurality of peaks, the size of a skirt portion in relation to the size near the peak is larger than that of the mono-peak fine protrusion (that is, the circumferential length is larger). Due to this, the multi-peak fine protrusion is said to have superior mechanical strength as compared to the mono-peak fine protrusion. Thus, it is thought that the antireflective article which includes multi-peak fine protrusions having a plurality of peaks provides improved scratch resistance as compared to an antireflective article having mono-peak fine protrusions only. Further, specifically, when external force is applied to the antireflective article, since the external force is distributed to a larger number of peaks than that of the antireflective article having mono-peak fine protrusions only, it is possible to reduce the external force applied to the respective peaks to make the fine protrusions rarely damaged. Therefore, it is possible to suppress local deterioration of the anti-reflection function and to suppress the occurrence of appearance defects. Moreover, even when fine protrusions are damaged, it is possible to reduce the area of the damaged region. Further, since the crest portions of the multi-peak fine protrusions receive the external force earlier than other portions as a sacrificial portion, damages of a body portion lower than the crests of the multi-peak fine protrusions and fine protrusions lower in height than the multi-peak fine protrusions. In this way, it is possible to suppress local deterioration of the anti-reflection function and to suppress the occurrence of appearance defects.

The measurement results illustrated in FIGS. 2 to 6 are measurement results of the antireflective article according to the present embodiment. In the frequency distribution illustrated in FIG. 5, two types of maximum values are present, including short-range maximum values of which the inter-adjacent protrusion distance d (the value on the horizontal axis) is 20 nm and 40 nm and long-range maximum values of which the inter-adjacent protrusion distance d is 120 nm and 164 nm. The long-range maximum value among these maximum values corresponds to an arrangement of fine protrusion bodies (portions ranging from the hillside to the foot under the apex), and the short-range maximum value corresponds to a plurality of peaks (crests) present near the apex. In this way, it is possible to understand the presence of multi-peak fine protrusions from a frequency distribution of inter-maximum point distances.

Although the multi-peak fine protrusions can improve scratch resistance by their presence, when a sufficient number of multi-peak fine protrusions are not present, it may be not possible to obtain a sufficient effect of improving the scratch resistance. In this respect, in the present invention, the proportion of the multi-peak fine protrusions in all fine protrusions present on the surface is set to 10% or more. In particular, in order to achieve a sufficient effect of the multi-peak fine protrusions improving the scratch resistance, the proportion of the multi-peak fine protrusions is 30% or more, and preferably, 50% or more.

Further, when the antireflective article having the fine protrusion group (5, 5A, 5B, . . . ) including such multi-peak fine protrusions 5A and 5B was examined in detail, the respective fine protrusions had different heights (see FIG. 6 and FIG. 11A). Here, the height of the fine protrusions means the height of a crest (highest crest) having the largest height present in an apex of a specific fine protrusion that shares the foot (root) portion with other fine protrusions. In the case of a mono-peak fine protrusion like the fine protrusion 5 of FIG. 11A, the height of the single crest (maximum point) of the apex is a protrusion height of the fine protrusion. Moreover, in the case of a multi-peak fine protrusion like the fine protrusions 5A and 5B of FIG. 11A, the height of the highest crest among a plurality of crests that shares the foot present in the apex is the height of the fine protrusion. When the fine protrusions have different heights in this manner, and the shape of tall fine protrusions is damaged by a contacting object, for example, the shape of short fine protrusions is maintained. Due to this, it is possible to suppress local deterioration of the anti-reflection function of the antireflective article and to suppress the occurrence of appearance defects. As a result, it is possible to improve the scratch resistance.

Moreover, when dust adheres between an object and the fine protrusion group on the surface of the antireflective article, and the object slides in relation to the antireflective article, the dust may function as an abrasive, and abrasion and damage of the fine protrusion (group) is accelerated. In this case, when the fine protrusions that forms the fine protrusion group have different heights, the dust may contact strongly with tall fine protrusions and may damage the fine protrusions. On the other hand, the contacting force with short fine protrusions is weak and the damage to the short fine protrusions is reduced, and the anti-reflection performance is maintained by short fine protrusions which are not damaged or slightly damaged.

In addition to this, a fine protrusion group having different heights exhibits an anti-reflection performance in a wide range of wavelengths and is advantageous in realizing low reflectance in all spectrum bands of light having multiple wavelengths like white light or light having a wide range of spectra. This is because a wavelength band in which the fine protrusion group exhibits an excellent anti-reflection performance depends on the protrusion height as well as the inter-adjacent protrusion distance d.

Moreover, in this case, only tall fine protrusions among a number of fine protrusions make contact with the surface of various members disposed so as to face the antireflective article 1, for example. Due to this, it is possible to improve sliding properties remarkably as compared to when the antireflective article has only fine protrusions having the same height and to facilitate the handling properties of the antireflective article in production steps. From the perspective of improving the sliding properties, a height difference needs to be 10 nm or more when defined by a standard deviation, and surface roughness is sensed if the height difference is larger than 50 nm. Thus, the height difference is preferably 10 nm or more and 50 nm or smaller.

Moreover, when multi-peak fine protrusions are present, it is possible to improve the anti-reflection performance as compared to when the antireflective article has mono-peak fine protrusion only. That is, the multi-peak fine protrusions 5A, 5B, and the like illustrated in FIG. 2, FIGS. 11A to 11C, and FIGS. 12A to 12C can decrease light reflectance as compared to mono-peak fine protrusions even when the multi-peak fine protrusions have the same inter-adjacent protrusion distance and the same protrusion height. This is because the multi-peak fine protrusions 5A, 5B, and the like exhibit a smaller change in height direction in effective refractive index near the apex than mono-peak fine protrusions having the same shape of the portion (the hillside and the foot) below the apex as the multi-peak fine protrusions.

That is, in FIGS. 11A to 11C, when z=0 is set to H=0 and the fine protrusions 5, 5A, and the like are cut along an imaginary cutting plane Z=z orthogonal to the height direction (Z-axis direction), an effective refractive index $n_{ef}$ obtained as an average of the refractive indexes between a fine protrusion on the plane Z=z and a surrounding medium (normally air) is expressed as follows. That is, when the refractive index of a surrounding medium (in this example, air) on the cutting plane Z=z is $n_A$=1, the refractive index of the constituent material of the fine protrusions 5, 5A, and the like is $n_M$>1, the sum of cross-sectional areas of the surrounding medium (air) is $S_A(z)$, and the sum of the cross-sectional areas of the fine protrusions 5, 5A, and the like is $S_M(z)$, the effective refractive index $n_{ef}$ is expressed by Expression 1 below.

$$n_{ef}(z)=1\times S_A(z)/(S_A(z)+S_M(z))+n_M\times S_M(z)/(S_A(z)+S_M(z))$$ (Expression 1)

Here, $0\leq z<H^{PEAK}{}_{MAX}$ and $H^{PEAK}{}_{MAX}$ is the height of a highest crest of the fine protrusion. This effective refractive index has a value obtained by proportionally distributing the refractive index $n_A$ of the surrounding medium and the refractive index $n_M$ of the constituent material of the fine protrusion by the sum of the total cross-sectional area $S_A(z)$ of the surrounding medium and the total cross-sectional area $S_M(z)$ of the fine protrusion, respectively.

Here, when the mono-peak fine protrusion 5 is considered as a reference, the multi-peak fine protrusions 5A, 5B, and the like are split into a plurality of crests near the apex. Thus, on the imaginary cutting plane Z=z that cuts the portion near the apex, the proportion of the total cross-sectional area $S_A(z)$ of the surrounding medium having a relatively low refractive index in the multi-peak fine protrusions 5A, 5B, and the like increases more than the proportion of the total cross-sectional area $S_M(z)$ of the fine protrusion having a relatively high refractive index as compared to the mono-peak fine protrusions 5 and the like.

As a result, the effective refractive index $n_{ef}(z)$ on the imaginary cutting plane Z=z of the multi-peak fine protrusions 5A, 5B, and the like approaches the refractive index $n_A$ of the surrounding medium more than the mono-peak fine protrusions 5 and the like. When a difference between the effective refractive index of the multi-peak fine protrusion and the refractive index of the surrounding medium on the plane Z=z is $|n_{ef}(z)-n_A(z)|_{multi}$ and a difference between the effective refractive index of the mono-peak fine protrusion and the refractive index of the surrounding medium on the plane Z=z is $|n_{ef}(z)-n_A(z)|_{mono}$, $$|n_{ef}(z)-n_A(z)|_{multi}<|n_{ef}(z)-n_A(z)|_{mono}$$ (Expression 2)

Here, if $n_A(z)=1$, $$|n_{ef}(z)-1|_{multi}<|n_{ef}(z)-1|_{mono}$$ (Expression 2A)

Due to this, the fine protrusion group (including the surrounding medium between fine protrusions) including multi-peak fine protrusions can reduce a difference (more specifically, a change in the refractive index per unit distance in the height direction of the fine protrusion) between the effective refractive index and the refractive index of the surrounding medium (air) near the apex as compared to a protrusion group made up of mono-peak fine protrusions only. That is, it is possible to further improve the continuity of the change in the height direction of the refractive index.

In general, when light enters an interface between a medium having the refractive index $n_0$ and an adjacent medium having the refractive index $n_1$, the reflectance R of light on the interface is expressed as follows at the incidence angle=0.

$$R=(n_1-n_0)^2/(n_1+n_0)^2$$ (Expression 3)

From this expression, the smaller the refractive index difference $(n_1-n_0)$ between the media on both sides of the interface, the smaller the light reflectance R at the interface, and the closer the refractive index difference $(n_1-n_0)$ approaches the value 0, the closer the reflectance R approaches the value 0.

From Expressions 2, 2A, and 3, the fine protrusion group (including the surrounding medium between the fine protrusions) including the multi-peak fine protrusions 5A, 5B, and the like can reduce the light reflectance better than a protrusion group made up of mono-peak fine protrusions 5 and the like.

Even when a fine protrusion group made up of the mono-peak fine protrusions 5 only is used, it is possible to provide a sufficient anti-reflection effect by setting the maximum value dmax of the inter-adjacent protrusion distances to a sufficiently small value no more than the shortest wavelength Λmin of the wavelength band of electromagnetic waves of which reflections are to be prevented. However, in this case, since the inter-adjacent crest distance is the same as an inter-fine protrusion distance, a phenomenon (so-called sticking) that the adjacent fine protrusions come into contact with each other to be integrated together may occur. When sticking occurs, a practical inter-adjacent protrusion distance d increases by the number of integrated fine protrusions.

For example, when four fine protrusions having d=200 nm are stuck together, the size of the stuck and integrated protrusion becomes d=4×200 nm=800 nm and becomes larger than the longest wavelength (780 nm) of the visible wavelength band. Thus, the anti-reflection effect deteriorates in this local region.

On the other hand, in the case of a fine protrusion group made up of the multi-peak fine protrusions 5A, 5B, and the like, an inter-adjacent protrusion distance $d^{PEAK}$ between crests near the apex is smaller than an inter-adjacent protrusion distance $d_{BASE}$ of a fine protrusion body ranging from the foot to the hillside ($d^{PEAK}<d_{BASE}$), and generally, $d^{PEAK}$ is approximately $d_{BASE}/4$ to $d_{BASE}/2$. Thus, when the inter-adjacent protrusion distance between respective crests is set such that $d^{PEAK}<<$Λmin, it is possible to obtain a sufficient anti-reflection performance. However, the ratio of the height of a crest portion of a multi-peak fine protrusion to the width of the crest portion is small and is approximately 1/2 to 1/10 of the ratio of the height of a peak of a mono-peak fine protrusion to the width of the crest portion. Thus, the crest portion of the multi-peak fine protrusion is less likely to be deformed than the mono-peak fine protrusion with respect to the same external force. On the other hand, the body portion itself of the multi-peak fine protrusion has a larger inter-adjacent protrusion distance and a larger strength than the crest portion. Thus, the fine protrusion group made up of multi-peak fine protrusions can suppress the sticking and realize a low reflectance more easily than the protrusion group made up of mono-peak fine protrusions.

In other applications of the anti-reflection of visible light or in visible light environments, by forming a moth-eye structure corresponding to intended anti-reflection wavelengths and providing a height distribution, it is possible to manufacture an anti-reflection material having scratch resistance superior to the conventional anti-reflection material. Moreover, even when a low-rigidity material is used due to process requirements, it is possible to manufacture an anti-reflection material which prevents sticking and provides a required optical performance. For example, when it is desired to provide an anti-reflection performance in an ultraviolet wavelength region around 380 nm, the moth-eye structure may have a height of approximately 50 nm. Similarly, when it is desired to provide an anti-reflection performance in an infrared wavelength region around 700 nm, the moth-eye structure may have a height of approximately 150 nm to 400 nm from practical reasons. The reflectance of the moth-eye structure can be effectively controlled by finding a production condition in which the arrangement pitch of the moth-eye structure saturates with respect to a height. Further, it is possible to obtain a satisfactory height and reflectance by adding an improvement in the apex structure of the moth-eye structure from the conventional mono-peak structure. Moreover, it is possible to prevent the occurrence of the sticking physically and reduce the reflectance effectively.

In the roll plate provided for creating such fine protrusions, micro-pores are bored by repeating anodization and etching while increasing the pore diameter, whereby micro-pores provided for molding fine protrusions are created. The multi-peak fine protrusions are formed by micro-pores having concave portions having the shape corresponding to the apexes of the moth-eye structure, and the micro-pores are created by integrating micro-pores created very closely to each other by etching. Thus, in order to form both multi-peak fine protrusions and mono-peak fine protrusions, the interval of micro-pores created by anodization may be varied greatly, which can be realized by increasing the variation during the anodization.

Moreover, it can be said that the variation in the height of the micro-pores results from a variation in the depth of micro-pores created in the roll plate and that the variation in the depth of micro-pores also results from the variation during the anodization.

Due to these reasons, in the present embodiment, the anodization conditions are set so that the variation increases to produce an antireflective article in which both fine protrusions having a plurality of peaks and mono-peak fine protrusions are present and the fine protrusion heights vary.

Here, an application voltage (formation voltage) in the anodization is in a proportional relation with the micro-pore interval, and the variation in the micro-pore interval increases when the application voltage deviates from a certain range. Due to this, by using an aqueous solution of sulfuric acid, oxalic acid, and phosphoric acid having a concentration of 0.01 M to 0.03 M and applying a voltage of 15 V (first step) to 35 V (second step: approximately 2.3 times the voltage in the first step), it is possible to manufacture a roll plate for producing antireflective articles in which both multi-peak fine protrusions and mono-peak fine protrusions are present and the height of fine protrusions varies. Since the variation in the micro-pore interval increases when the application voltage varies, the application voltage may be varied intentionally by generating the application voltage using an AC voltage biased by a DC power source, for example. Moreover, the anodization may be executed using a power source having a large voltage variation.

Figure 12A:
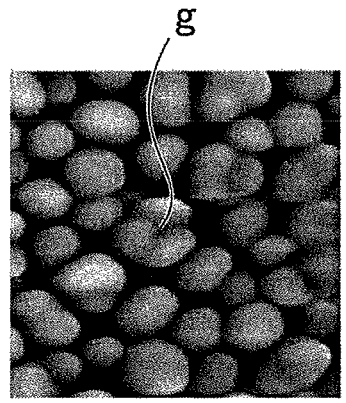
FIG. 12A to 12C are pictures of fine protrusions.
Figure 12B:
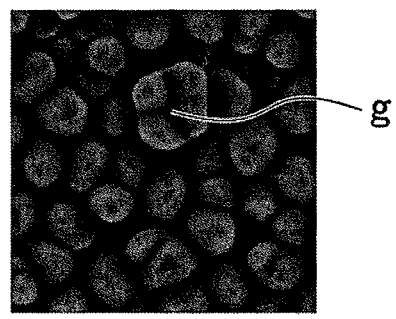
Figure 12C:
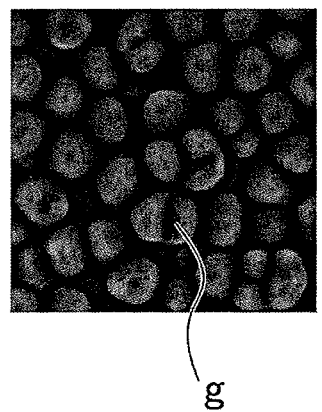

FIGS. 12A to 12C are pictures illustrating fine protrusions having a plurality of peaks, in which FIG. 12A illustrates an AFM picture and FIGS. 12B and 12C illustrate SEM pictures. FIG. 12A illustrates a fine protrusion having a groove g and three peaks and a fine protrusion having a groove g and two peaks, FIG. 12B illustrates a fine protrusion having a groove g and four peaks and a fine protrusion having a groove g and two peaks, and FIG. 12C illustrates a fine protrusion having a groove g and three peaks and a fine protrusion having a groove g and two peaks.

Further, when both mono-peak fine protrusions and multi-peak fine protrusions are present as in the present embodiment, it is possible to reduce the reflectance in a wide wavelength band in the same manner as when mono-peak fine protrusions having different aspect ratios are present.

That is, when micro-pores are created by anodization, the pitch and the depth of micro-pores are in a proportional relation. Due to this, when a molding mold is manufactured by repeating anodization and etching and this type of antireflective articles is manufactured by performing molding using the molding mold, the created mono-peak fine protrusions have approximately the same aspect ratio which is the ratio of the width of the root portion to the height.

The anti-reflection function of the antireflective article depends on an aspect ratio as well as the fine protrusion interval. If the aspect ratio is constant, the reflectance increases and the anti-reflection function becomes insufficient in an ultraviolet wavelength region as compared to the visible wavelength region even when a sufficiently small reflectance can be secured in the visible wavelength region, for example. In such a case, the fine protrusion pitch may be decreased further so that a sufficient anti-reflection function can be secured in the ultraviolet wavelength region. However, in this case, the height is not sufficient in the infrared wavelength region and the reflectance increases.

However, in multi-peak fine protrusions, it is possible to secure an anti-reflection function equivalent to when the adjacent protrusion interval was decreased. Due to this, by forming both multi-peak fine protrusions and mono-peak fine protrusions, it is possible to secure low reflectance in a wide wavelength band. When it is desired to secure a sufficiently low reflectance in a wide wavelength band around the visible wavelength region, it is preferable to form both multi-peak fine protrusions and mono-peak fine protrusions having an adjacent protrusion interval of 480 nm to 660 nm corresponding to the wavelengths 480 nm to 660 nm associated with the visible wavelength region.

These features of the multi-peak fine protrusions according to the present embodiment are features which are unique to the multi-peak fine protrusions created by micro-pores having the shape corresponding to the molding mold, and which cannot be obtained by multi-peak fine protrusions in which resin filling defects disclosed in Japanese Unexamined Patent Application, Publication No. 2012-037670 occur. That is, since multi-peak fine protrusions caused by resin filling defects are naturally formed when resin is not sufficiently filled in micro-pores created as mono-peak fine protrusions, the inter-peak interval is very small. Due to this, such multi-peak fine protrusions cannot contribute to improvement of scratch resistance and it may be difficult to improve the optical properties described above.

Moreover, the multi-peak fine protrusions caused by resin filling defects are insufficient in reproducibility and it is not possible to mass-produce uniform articles. In contrast, the multi-peak fine protrusions according to the present embodiment are multi-peak fine protrusions created by a mold which is produced with high reproducibility using a mold, and it is possible to secure uniform and high mass-producibility. Moreover, although the height distribution of the multi-peak fine protrusions according to the present embodiment can be controlled as will be described in other embodiments, such control is difficult in multi-peak fine protrusions caused by resin filling defects.

Figure 13A:
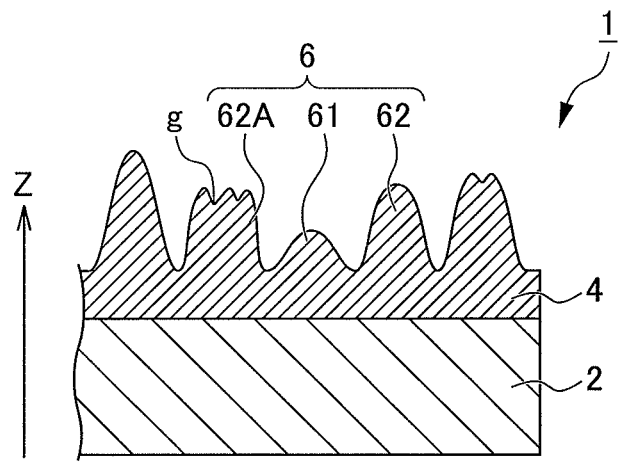
FIGS. 13A to 13C are diagrams provided for describing an annular fine protrusion group.
Figure 13B:
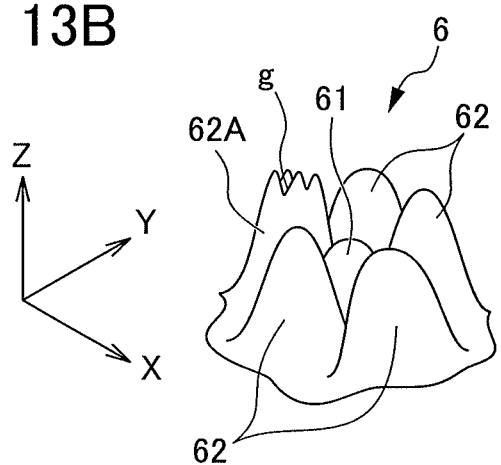
Figure 13C:
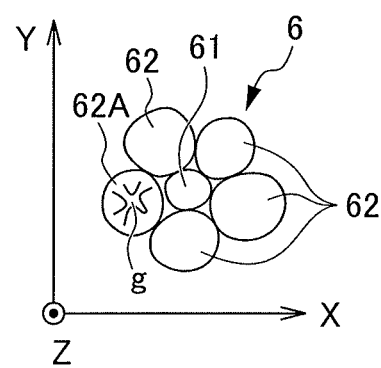

Portions of the multi-peak fine protrusions and mono-peak fine protrusions form an annular fine protrusion group 6 including a plurality of fine protrusions having different heights as illustrated in FIGS. 13A to 13C as compared to FIGS. 11A to 11C. Here, the annular fine protrusion group 6 means a group of fine protrusions in which a plurality of (preferably four) outer fine protrusions 62 having a relatively large height surrounds an inner fine protrusion 61 having a relatively small height.

In the annular fine protrusion group 6 made up of a plurality of fine protrusions having different heights, even when the shape of the tall outer fine protrusions 62 is damaged by a contacting object, for example, the shape of the short inner fine protrusion 61 is maintained. When such an annular fine protrusion group 6 is formed in an antireflective article, it is possible to suppress deterioration of the anti-reflection function in a local region and to suppress the occurrence of appearance defects. As a result, it is possible to improve the scratch resistance.

Moreover, as described above in relation to multi-peak fine protrusions, due to the annular fine protrusion group 6, it is possible to suppress damages caused by adhering dust and to maintain an anti-reflection performance. Moreover, in the annular fine protrusion group 6, only the outer fine protrusions 62 among the plurality of fine protrusions make contact with the surface of various members disposed so as to face the antireflective article 1, for example. Due to this, it is possible to improve sliding properties remarkably as compared to when the antireflective article has only fine protrusions having the same height and to facilitate the handling properties of the antireflective article in production steps. From the perspective of improving the sliding properties, a height difference needs to be 10 nm or more when defined by a standard deviation, and surface roughness is sensed if the height difference is larger than 50 nm. Thus, the height difference is preferably 10 nm or more and 50 nm or smaller.

Although the annular fine protrusion group 6 can improve scratch resistance by its presence, when a sufficient number of annular fine protrusion groups are not present, it may be not possible to obtain a sufficient effect of improving the scratch resistance. Moreover, if the presence proportion is too large, the effect of localizing the portion damaged by the contacting surface of other members may naturally decrease. In this respect, in the present invention, the proportion (hereinafter referred to as an "annular fine protrusion group proportion") of fine protrusions that constitute the annular fine protrusion group 6 among the fine protrusions present on the surface is set to 10% or more and 95% or smaller. In particular, in order to achieve a sufficient effect of the annular fine protrusion group 6 improving the scratch resistance, the annular fine protrusion group proportion is set to 30% or more and 95% or smaller, and preferably, 50% or more and 80% or smaller.

Figure 14A:
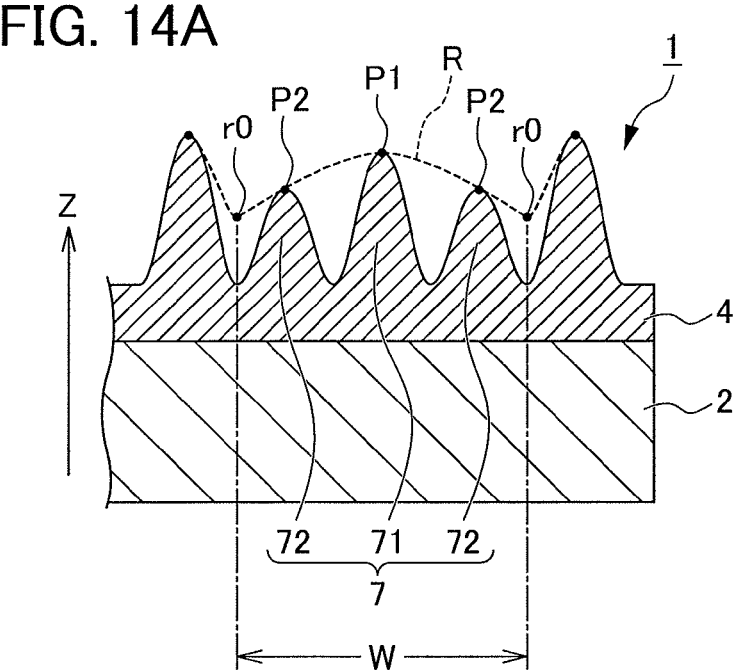
FIGS. 14A-14C are diagrams provided for describing a convex protrusion group.
Figure 14B:
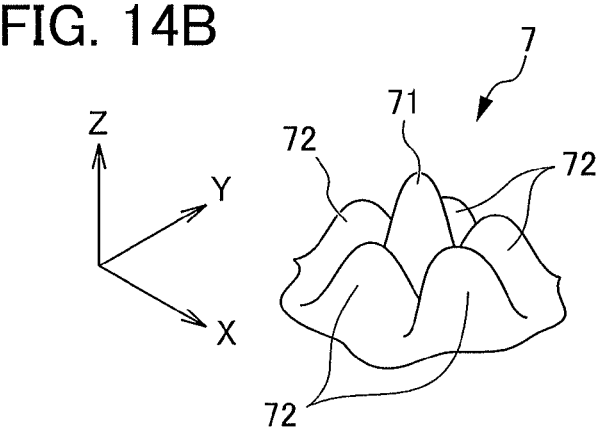
Figure 14C:
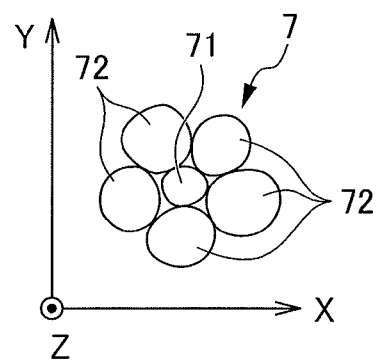

Furthermore, portions of multi-peak fine protrusions and mono-peak fine protrusions form a generally bell-shaped convex protrusion group 7 in which a plurality of surrounding fine protrusions having a relatively small height is formed around one apex fine protrusion having a relatively large height as illustrated in FIGS. 14A to 14C as compared to FIGS. 11A to 11C and FIGS. 13A to 13C. Preferably, the convex protrusion group 7 has a plurality of surrounding fine protrusions which is arranged so that the height decreases gradually as it departs from the apex fine protrusion.

In the convex protrusion group 7 made up of a plurality of fine protrusions having different heights, even when the shape of a tall apex fine protrusion 71 is damaged by a contacting object, for example, the shape of short surrounding fine protrusions 72 is maintained. When such a convex protrusion group 7 is formed in an antireflective article, it is possible to suppress deterioration of the anti-reflection function in a local region and to suppress the occurrence of appearance defects. As a result, it is possible to improve the scratch resistance.

Moreover, similarly to the multi-peak fine protrusions and annular protrusion groups, it is possible to suppress damages caused by adhering dust and to maintain an anti-reflection performance. Moreover, in the convex protrusion group 7, only the apex fine protrusion 71 makes contact with the surface of various members disposed so as to face the antireflective article 1, for example. Due to this, similarly to the case of annular protrusion groups, it is possible to improve sliding properties remarkably as compared to when the antireflective article has only fine protrusions having the same height and to facilitate the handling properties of the antireflective article in production steps. From the perspective of improving the sliding properties, a height difference needs to be 10 nm or more when defined by a standard deviation, and surface roughness is sensed if the height difference is larger than 50 nm. Thus, the height difference is preferably 10 nm or more and 50 nm or smaller.

Further, in the convex protrusion group 7, when the surrounding fine protrusions 72 have a height that decreases as it departs from the apex fine protrusion 71, and more preferably, when an envelope surface of the convex protrusion group 7, which includes the peaks (P1, P2, . . . ) of the fine protrusions and of which the width increases as it approaches from the peak (P1) of the apex fine protrusion 71 toward the lower end (r0) has a bell-shaped curved surface, as illustrated in FIGS. 14A to 14C, the convex protrusion group 7 can exhibit the same effect as the effect provided by single fine protrusions of the so-called moth-eye structure. Therefore, the antireflective article 1 having the convex protrusion group 7 can provide an anti-reflection effect equivalent or superior to when only single fine protrusions are present as well as providing the effect of improving the scratch resistance described above.

Here, the envelope surface of the convex protrusion group 7 is a portion of a free surface created by the Bezier curve (or the B-spline curve) that includes respective maximum points of the fine protrusions of the antireflective article 1 and means a curved surface formed in a portion that ranges from one lower end r0 of a curved line to the other lower end r0 while passing through the peak (P1) of the apex fine protrusion 71. The maximum value of the distances between a plurality of points r0 in one envelope surface is defined as the width W of the convex protrusion group 7.

When the width W of the convex protrusion group 7 is 780 nm or smaller, the convex protrusion group 7 can contribute to improving the anti-reflection effect in the largest wavelength of the visible wavelength band similarly to when the inter-adjacent protrusion distance d between single fine protrusions is $\lambda_{max}$ (780 nm) or smaller as described above. Similarly, when the width W of the convex protrusion group 7 is 380 nm or smaller, the convex protrusion group 7 can contribute to improving the anti-reflection effect to light beams of all wavelengths of the visible wavelength band.

Although the convex protrusion group 7 can improve scratch resistance by its presence, when a sufficient number of convex protrusion groups are not present, it may be not possible to obtain a sufficient effect of improving the scratch resistance. Moreover, if the presence proportion is too large, the effect of localizing the portion damaged by the contacting surface of other members may naturally decrease. In this respect, in the present invention, the proportion (hereinafter referred to as an "convex protrusion group proportion") of fine protrusions that constitute the convex protrusion group 7 among the fine protrusions present on the surface is set to 10% or more and 95% or smaller. In particular, in order to achieve a sufficient effect of the convex protrusion group 7 improving the scratch resistance, the convex protrusion group proportion is set to 30% or more and 90% or smaller, and preferably, 50% or more and 85% or smaller.

When both mono-peak fine protrusions and multi-peak fine protrusions are present as in the present embodiment, it is possible to secure low reflectance in a wide wavelength band in the same manner as when mono-peak fine protrusions having different aspect ratios are present.

That is, when micro-pores are created by anodization, the pitch and the depth of micro-pores are in a proportional relation. Due to this, when a molding mold is manufactured by repeating anodization and etching and this type of antireflective articles is manufactured by performing molding using the molding mold, the created mono-peak fine protrusions have approximately the same aspect ratio which is the ratio of the width of the root portion to the height.

The anti-reflection function of the antireflective article depends on an aspect ratio as well as the fine protrusion interval. If the aspect ratio is constant, the reflectance increases and the anti-reflection function becomes insufficient in an ultraviolet wavelength region as compared to the visible wavelength region even when a sufficiently small reflectance can be secured in the visible wavelength region, for example. When the fine protrusion pitch is decreased further so that a sufficient anti-reflection function can be secured in the ultraviolet wavelength region, the anti-reflection function may deteriorate in the infrared wavelength region.

However, in multi-peak fine protrusions, it is possible to secure an anti-reflection function by decreasing the adjacent protrusion interval. Due to this, by forming both multi-peak fine protrusions and mono-peak fine protrusions, it is possible to secure low reflectance in a wide wavelength band. When it is desired to secure a sufficiently low reflectance in a wide wavelength band around the visible wavelength region, it is preferable to form both multi-peak fine protrusions and mono-peak fine protrusions having an adjacent protrusion interval of 480 nm to 660 nm corresponding to the wavelengths 480 nm to 660 nm associated with the visible wavelength region.

Figure 15:
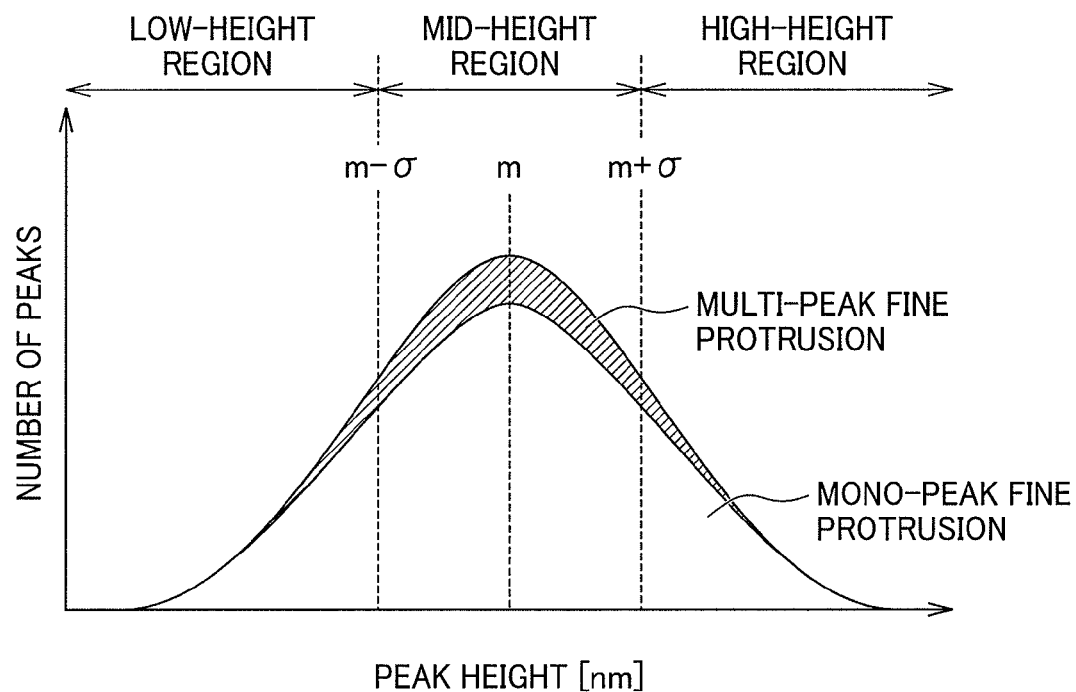
FIG. 15 is a diagram illustrating an example of a frequency distribution of the height h of fine protrusions formed in the antireflective article.

Here, the multi-peak fine protrusions formed on the antireflective article need to satisfy the following conditions in order to improve the anti-reflection function for incident light in the visible wavelength region. FIG. 15 is a diagram illustrating an example of the frequency distribution of height h of fine protrusions formed on the antireflective article. As illustrated in FIG. 15, when an average and a standard deviation of the height in the frequency distribution of fine protrusion height h are m and $\sigma$, a region of $h<m-\sigma$ is a low-height region of fine protrusions, a region of $m-\sigma \leq m+\sigma$ is a mid-height region, and a region of $m+\sigma<h$ is a high-height region, the ratio of the number Nm of multi-peak fine protrusions in each region to a total number Nt of fine protrusions in the entire frequency distribution needs to satisfy the following conditions (a) and (b).

$Nm/Nt$ in mid-height region>$Nm/Nt$ in low-height region   (a)

$Nm/Nt$ in mid-height region>$Nm/Nt$ in high-height region   (b)

According to this configuration, since both multi-peak fine protrusions having a plurality of peaks and mono-peak fine protrusions having one peak are formed, it is possible to improve the scratch resistance as compared to the conventional antireflective article.

Further, since the fine protrusions has a height distribution, it is possible to improving sliding properties.

[Second Embodiment]

In the present embodiment, the height distribution of fine protrusions is controlled. That is, in an antireflective article, it is possible to control characteristics in a viewing direction in which the anti-reflection function is to be achieved by controlling the height distribution of fine protrusions. Thus, in the present embodiment, in the step of forming a molding mold by alternately repeating anodization and etching, the application voltage during the repeated anodization is varied. Here, when micro-pores are created by anodization, the application voltage during anodization is proportional to the micro-pore pitch. Due to this, when the application voltage during the anodization in the repeated anodization and etching is varied, it is possible to form micro-pores of which the boring periods in the depth direction are different and to control the proportion thereof. In this way, it is possible to control the height distribution of fine protrusions.

Moreover, when the application voltage is varied during the anodization in this manner, a plurality of micro-pores can be formed on the bottom surface of bold micro-pores as the micro-pores associated with multi-peak fine protrusions. Moreover, it is possible to control the height distribution of the multi-peak fine protrusions by controlling the height of the bold micro-pores and the depth of the micro-pores formed on the bottom surface.

FIGS. 16A to 16E are schematic diagrams provided for describing the control of a height distribution and illustrate micro-pores created in the anodization and etching steps in the molding mold producing step. The application voltage during anodization is proportional to the pitch of the created micro-pores. However, practically, the micro-pore pitch has variations due to the grain boundary of aluminum provided for the treatments. However, in FIGS. 16A to 16E, it is assumed that such variations are not present and the micro-pores are created in a regular arrangement. FIGS. 16A to 16E are plan views of micro-pores created in respective steps and the corresponding cross-sectional views along line a-a.

Figure 16A:
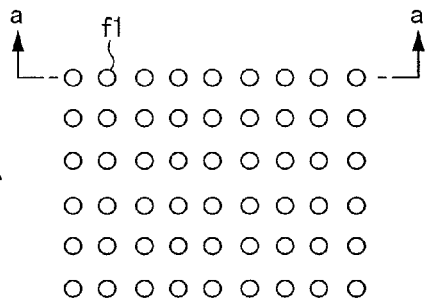
FIGS. 16A to 16E are diagrams provided for describing the steps of manufacturing a roll plate according to a second embodiment.
Figure 16A:
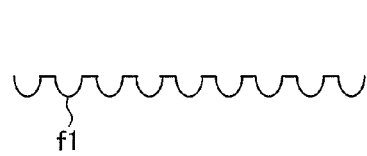

First, in the present embodiment, first anodization is executed using a low application voltage V1, and then, etching (hereinafter appropriately referred to a first step) is executed to create micro-pores f1 having a basic pitch associated with the low application voltage V1 as illustrated in FIG. 16A. Here, the first anodization involves creating a trigger for subsequent anodization on a flat aluminum surface. In this case, etching of the first step may be omitted as necessary.

Figure 16B:
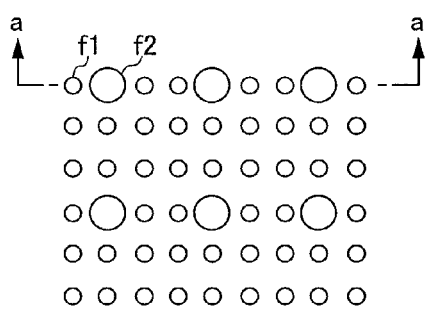
Figure 16B:
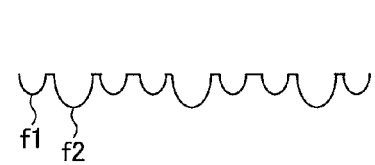

Subsequently, in the present embodiment, second anodization is executed using a higher application voltage V2 (V2>V1) than that used in the first anodization, and then, etching is executed (hereinafter appropriately referred to a second step). Here, in this case, as illustrated in FIG. 16B, since the application voltage is increased, only the micro-pores corresponding to the application voltage associated with the second anodization among the micro-pores f1 created by the first anodization are bored (indicated by symbol f2) in the depth direction and are etched. Due to this second step, when the application voltage is varied in two steps, it is possible to form both micro-pores having different depth distributions.

Figure 16C:
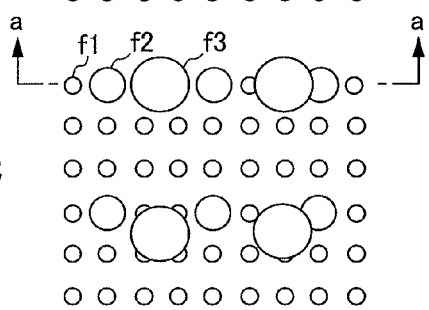
Figure 16C:

Subsequently, in the present embodiment, third anodization is executed using a higher application voltage V3 (V3>V2) than that used in the second anodization, and then, etching is executed (hereinafter appropriately referred to as a third step) (FIG. 16C). Here, the third step is a step for creating micro-pores having different pitches. Thus, in this step, the application voltage is gradually increased from the application voltage V2 of the second anodization step. Here, when the application voltage is increased in a discrete (step-wise) manner, it is possible to set the height distribution of fine protrusions in a discrete manner and to form both micro-pores having different depth distributions. Moreover, when the application voltage is changed continuously, it is possible to set the depth distribution to have a normal distribution.

Further, in the third step, the application period of the specific voltage associated with the anodization and an etching period are set to be longer than those of the first and second steps. As a result, the micro-pores f1 and f2 created in the first and second steps are etched combined and a micro-pore having an approximately flat bottom is created as indicated by symbol f3.

Figure 16D:
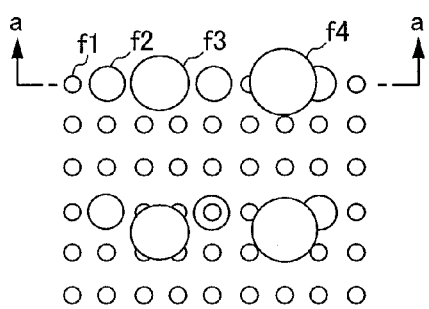
Figure 16D:
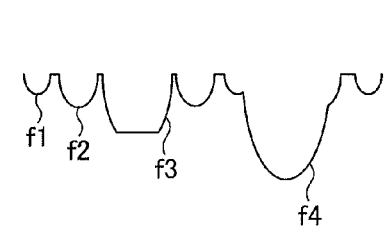

Subsequently, in the present embodiment, fourth anodization is executed using a higher application voltage V4 (V4>V3) than that used in the third anodization is executed, and then, etching is executed (hereinafter appropriately referred to a fourth step) (FIG. 16D). Here, the fourth step is a step for creating micro-pores having the pitch corresponding to an intended inter-protrusion interval, and the application voltage V4 is a voltage corresponding to the pitch. In the fourth step, since the application voltage is increased, a portion of micro-pores which have been bored further in the third step is further bored, and the further-bored micro-pore becomes a micro-pore f4 corresponding to a mono-peak fine protrusion.

Figure 16E:
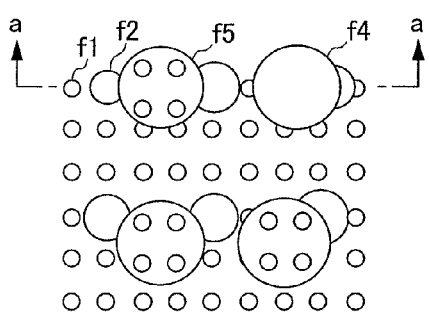
Figure 16E:
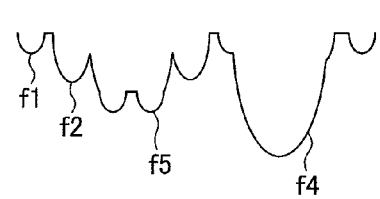

Subsequently, in the present embodiment, fifth anodization is executed using the application voltage V1 of the first step, and then, etching is executed (FIG. 16E). Here, in the fifth step, a plurality of micro-pores is formed on the bottom surface of the micro-pore of which the bottom surface is formed as a flat surface in the third step and which is not affected by the anodization in the fourth step, whereby micro-pores f5 for multi-peak fine protrusions are created. Here, by adjusting the application voltage V1 of the fifth step, it is possible to increase and decrease the number of micro-pores f5 formed on the bottom surface.

Here, in this series of steps, micro-pores f1 and f2 having different depths created in the first and second steps are bored further in the third step to create the fine protrusion f3 having an approximately flat bottom surface, the micro-pore associated with the mono-peak fine protrusion is created in the fourth step, and the bottom surface of the fine protrusion f3 having a flat bottom surface is processed in the fifth step to create the micro-pores associated with mono-peak fine protrusions. Thus, it is possible to control the height distribution of the fine protrusions and the height distribution of the multi-peak fine protrusions by controlling the application voltage, the processing period, and the etching period in the anodization associated with the first to fourth steps to control the depth and the like of the micro-pores created in the respective steps. The first to fifth steps may naturally be omitted, repeated, or integrated as necessary.

Figure 17:
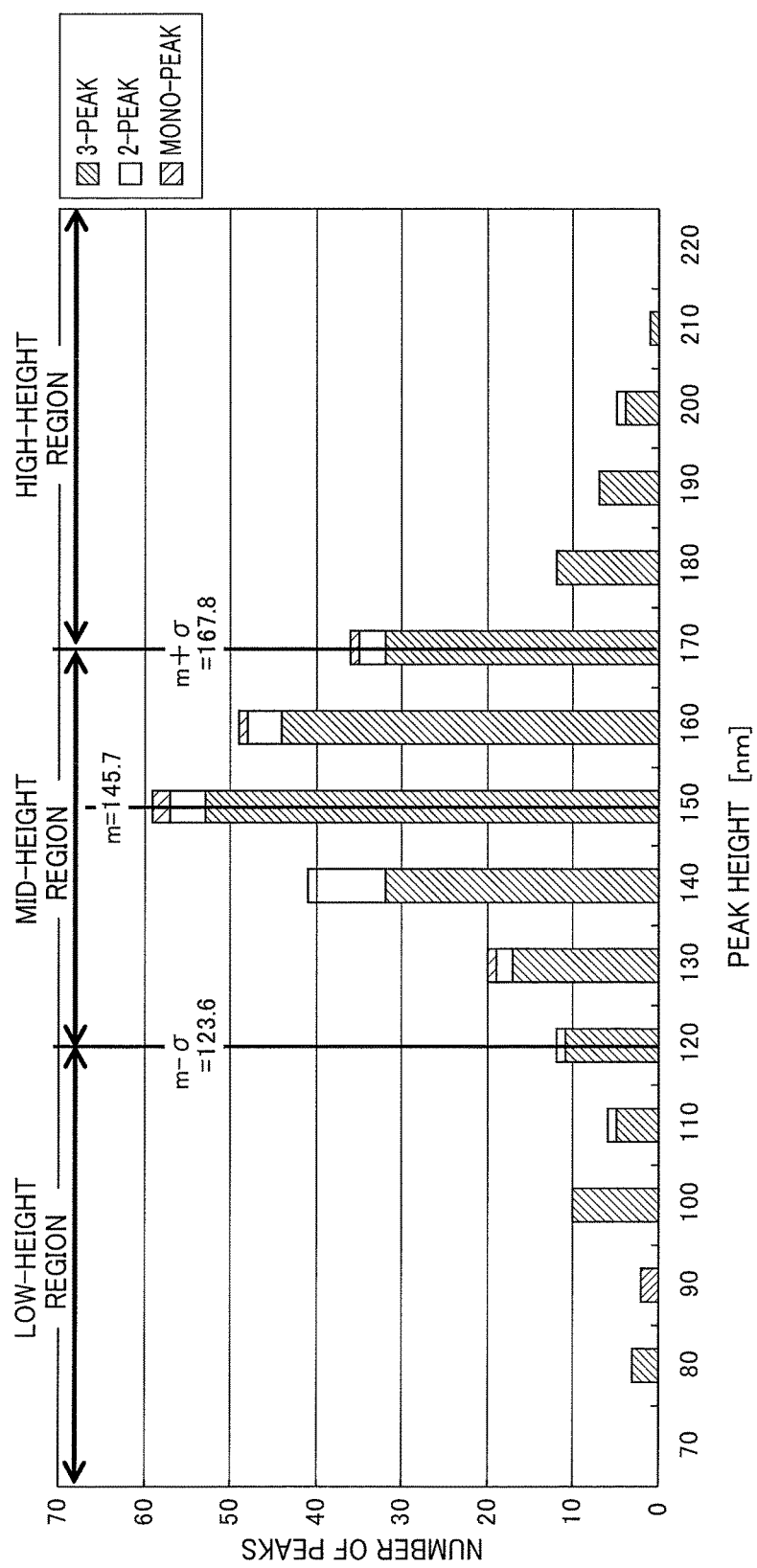
FIG. 17 is a diagram illustrating a height distribution.

FIG. 17 is a diagram illustrating a height distribution of fine protrusions produced using the roll plate manufactured by the first to fifth steps. The example of FIG. 17 is obtained by continuously changing the application voltage in the anodization in the second, third, and fourth steps and decreasing the voltage from the application voltage of the third step in the fourth step. In an antireflective article produced using this molding mold, the height distribution of fine protrusions has a normal distribution. Thus, it is possible to secure a satisfactory anti-reflection function in a relatively narrow range about the vertical line of a surface on which the fine protrusions are created. In this case, multi-peak fine protrusions (those having two and three peaks are indicated by 2-peak and 3-peak, respectively) have such a normal height distribution that the protrusions have approximately the same average height. Due to this, it is possible to efficiently improve the scratch resistance and optical properties of the multi-peak fine protrusions.

In an antireflective article of the embodiment manufactured according to the above-described method, an average of the fine protrusion heights is m=145.7 nm and a standard deviation is $\sigma$=22.1 nm, as illustrated in FIG. 17.

Here, in a frequency distribution of the fine protrusion height h, the low-height region is defined as h<m−$\sigma$=123.6 nm, the mid-height region is defined as m−$\sigma$=123.6 nm≤h≤m+$\sigma$=167.8 nm, and the high-height region is defined as h>m+$\sigma$=167.8 nm.

The total number Nt of fine protrusions in the entire frequency distribution is 263. Moreover, since the number Nm of multi-peak fine protrusions in the mid-height region is 23, Nm/Nt in the mid-height region is 0.087. Since the number Nm of multi-peak fine protrusions in the low-height region is 2, Nm/Nt in the low-height region is 0.008. Since the number Nm of multi-peak fine protrusions in the high-height region is 5, Nm/Nt in the high-height region is 0.019.

Thus, the antireflective article of the present embodiment satisfies the relations (a) and (b):

$$Nm/Nt \text{ in mid-height region}(=0.087) > Nm/Nt \text{ in low-height region}(=0.008) \quad (a)$$

$$Nm/Nt \text{ in mid-height region}(=0.087) > Nm/Nt \text{ in high-height region}(=0.019) \quad (b)$$

With the above-described configuration, in the present embodiment, the frequency distribution of fine protrusion heights has a crest of a distribution having one apex, and a larger number of multi-peak protrusions are distributed near the apex than the skirt portion of the crest of the distribution. Thus, it is possible to limit the viewing-angle properties and to improve the scratch resistance of multi-peak fine protrusions more efficiently.

Moreover, multi-peak fine protrusions are formed so that the ratio (Nm/Nt) of the number (Nm) of multi-peak fine protrusions in the mid-height region to the total number (Nt) of fine protrusions in the frequency distribution is larger than that of the low-height region and the high-height region. Thus, it is possible to reduce the reflectance of incident light in the visible wavelength region and to widen the wavelength band of the anti-reflection function of the antireflective article. Moreover, in this antireflective article, multi-peak fine protrusions (those having two and three peaks are indicated by 2-peak and 3-peak, respectively) have such a normal height distribution that the protrusions have approximately the same average height. That is, since the frequency distribution of fine protrusion heights has a crest of a distribution having one apex, it is possible to limit the viewing-angle properties. Further, since a larger number of multi-peak protrusions are distributed near the apex than the skirt portion of the crest of the height frequency distribution, it is possible to improve the scratch resistance of multi-peak fine protrusions efficiently. Further, with the above-described configuration, in the antireflective article, the proportion of multi-peak fine protrusions present in fine protrusions having a larger height (180 nm or more) is small and the proportion of mono-peak fine protrusions is large. Thus, even when another object makes fractional contact with fine protrusions, the object makes first contact with tall mono-peak fine protrusions and is prevented from making contact with multi-peak fine protrusions which mainly improve the anti-reflection function.

[Third Embodiment]

Figure 18:
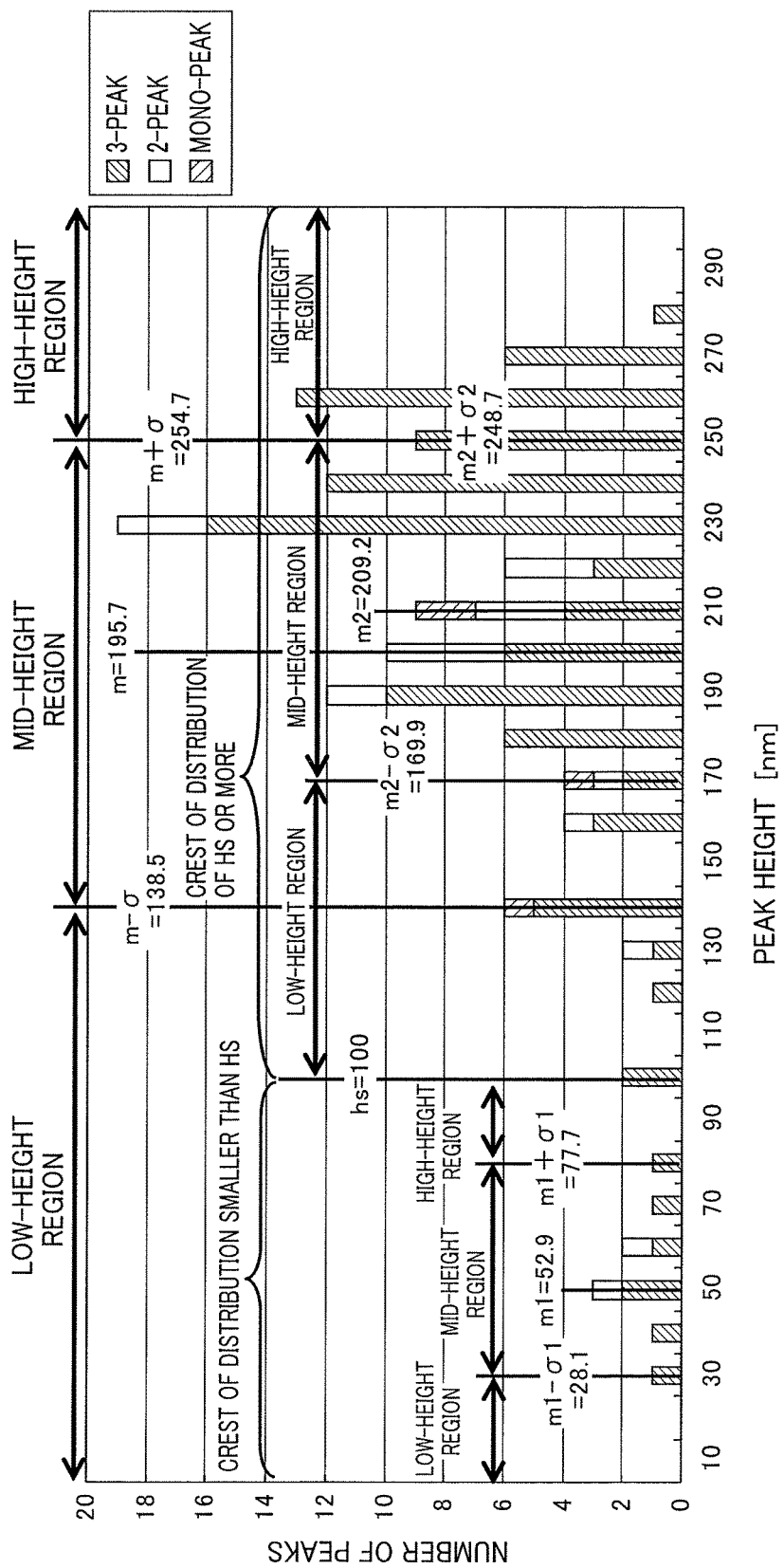
FIG. 18 is a diagram illustrating a height distribution in an antireflective article according to a third embodiment.

FIG. 18 is a diagram illustrating a frequency distribution of height h of fine protrusions in an antireflective article according to a third embodiment of the present invention. The present embodiment has the same configuration as the above-described embodiment except for the configuration related to the height distribution.

Here, a molding mold of the present embodiment is produced in the following manner. That is, in the first to fifth steps (FIG. 16), the voltage is increased gradually in the second step to execute the treatment of the third step, anodization is executed using a higher voltage in the fourth step, and the fifth step is executed twice. In an antireflective article produced in this manner, as illustrated in FIG. 18, the height distribution of fine protrusions has a discrete (double-peak) distribution, and a distribution of multi-peak fine protrusions is formed so as to correspond to each crest of the distribution.

In the antireflective article of the present embodiment, the frequency distribution has a double-peak distribution, and an average of the fine protrusion heights of the frequency distribution is m=195.7 nm and the standard deviation is σ=57.2 nm.

Here, in the frequency distribution of fine protrusion height h, the low-height region is defined as h<m−σ=138.5 nm, the mid-height region is defined as m−σ=138.5 nm≤h≤m+σ=254.7 nm, and the high-height region is defined as h>m+σ=254.7 nm. The total number Nt of fine protrusions in the entire frequency distribution is 131. Moreover, since the number Nm of multi-peak fine protrusions in the mid-height region is 21, Nm/Nt in the mid-height region is 0.160. Since the number Nm of multi-peak fine protrusions in the low-height region is 3, Nm/Nt in the low-height region is 0.023. Since the number Nm of multi-peak fine protrusions in the high-height region is 0, Nm/Nt in the high-height region is 0.

Thus, the antireflective article of the present embodiment satisfies the relations (a) and (b) described in the first embodiment:

$$Nm/Nt \text{ in mid-height region}(=0.160) > Nm/Nt \text{ in low-height region}(=0.023) \quad (a)$$

$$Nm/Nt \text{ in mid-height region}(=0.160) > Nm/Nt \text{ in high-height region}(=0) \quad (b)$$

Moreover, as described above, the frequency distribution of height h of fine protrusions of the antireflective article of the present embodiment has a double-peak distribution (that is, the distribution has two crests). In this case, it is necessary to define the low-height region, the mid-height region, and the high-height region with respect to each crest of the distribution and to compare and evaluate the ratio of the number of multi-peak fine protrusions in respective regions of each crest and the total number Nt of fine protrusions in the entire frequency distribution.

Specifically, when a height serving as the boundary between respective crests is hs, an average of the height h for the crest (the crest of a distribution having a smaller height) of the distribution smaller than hs is m1, the standard deviation is σ1, the region of h<m1−σ1 is a low-height region, the region of m1−σ1≤h<m1+σ1 is a mid-height region, and the region of m1+σ1<h<hs is a high-height region, the ratio of the number Nm1 of multi-peak fine protrusions in respective regions of the crest of the distribution smaller than hs to the total number Nt of fine protrusions in the entire frequency distribution needs to satisfy the following relations (c) and (d).

$$Nm1/Nt \text{ in mid-height region} > Nm1/Nt \text{ in low-height region} \quad (c)$$

$$Nm1/Nt \text{ in mid-height region} > Nm1/Nt \text{ in high-height region} \quad (d)$$

Moreover, for the crest (the crest of the distribution having a larger height) of the distribution of hs or more, when the average of height h is m2, the standard deviation is σ2, the region of hs<h<m2−σ2 is a low-height region, the region of m2−σ2≤h≤m2+σ2 is a mid-height region, and the region of m2+σ2<h is a high-height region, the ratio of the number Nm2 of multi-peak fine protrusions in respective regions of the crest of the distribution of hs or more to the total number Nt of fine protrusions in the entire frequency distribution needs to satisfy the following relations (e) and (f).

$$Nm2/Nt \text{ in mid-height region} > Nm2/Nt \text{ in low-height region} \quad (e)$$

$$Nm2/Nt \text{ in mid-height region} > Nm2/Nt \text{ in high-height region} \quad (f)$$

Here, the average of fine protrusion height h of the crest of the distribution smaller than hs (having a smaller height) is m1=52.9 nm and the standard deviation is σ1=24.8 nm. The boundary between the crests of the distribution is calculated as hs=100 nm by statistically processing the height data of the frequency distribution.

Due to this, in the crest of the distribution smaller than hs, the low-height region is defined as h<m1−σ1=28.1 nm, the mid-height region is defined as m1−σ1=28.1 nm≤h≤m1+σ1=77.7 nm, and the high-height region is defined as m1+σ1=77.7 nm<h<hs=100 nm.

Moreover, since the number Nm1 of multi-peak fine protrusions in the mid-height region is 2, Nm1/Nt in the mid-height region is 0.015. Since the number Nm1 of multi-peak fine protrusions in the low-height region is 0, Nm1/Nt in the low-height region is 0. Since the number Nm1 of multi-peak fine protrusions in the high-height region is 0, Nm1/Nt in the high-height region is 0.

Thus, in the crest of the distribution smaller than hs, the antireflective article of the present embodiment satisfies the relations (c) and (d):

$$Nm1/Nt \text{ in mid-height region}(=0.015) > Nm1/Nt \text{ in low-height region}(=0) \quad (c)$$

$$Nm1/Nt \text{ in mid-height region}(=0.015) > Nm1/Nt \text{ in high height region}(=0) \quad (d)$$

Moreover, the average of height h of fine protrusions of the crest of the distribution of hs or more (having a larger height) is m2=209.2 nm and the standard deviation is σ2=39.4 nm. Thus, the low-height region of the crest of the distribution of hs or more is defined as hs=100 nm≤h<m2−σ2=169.9 nm, the mid-height region is defined as m2−σ2=169.9 nm<h≤m2+σ2=248.7 nm, and the high-height region is defined as m+σ=248.7 nm<h. Moreover, since the number Nm2 of multi-peak fine protrusions in the mid-height region is 19, Nm2/Nt in the mid-height region is 0.145. Since the number Nm2 of multi-peak fine protrusions in the low-height region is 3, Nm2/Nt in the low-height region is 0.023. Since the number Nm2 of multi-peak fine protrusions in the high-height region is 0, Nm2/Nt in the high-height region is 0.

Thus, in the crest of the distribution of hs or more, the antireflective article of the present embodiment satisfies the relations (e) and (f):

$$Nm2/Nt \text{ in mid-height region}(=0.145) > Nm2/Nt \text{ in low-height region}(=0.023) \quad (e)$$

$Nm2/Nt$ in mid-height region(=0.145)>$Nm2/Nt$ in
high height region(=0)                                    (f)

From the above, in the antireflective article of the present embodiment, multi-peak fine protrusions are formed so that the ratio (Nm/Nt) of the number (Nm) of multi-peak fine protrusions in the mid-height region to the total number (Nt) of fine protrusions in the frequency distribution is larger than that of the low-height region and the high-height region. Thus, it is possible to reduce the reflectance of incident light in the visible wavelength region and to widen the wavelength band of the anti-reflection function of the antireflective article.

Moreover, since the antireflective article of the present embodiment has a double-peak frequency distribution and satisfies the relations of (c) to (f), the multi-peak fine protrusions in the crest of the distributions can be distributed so as to concentrate near the apex of the crest of the distributions. Due to this, it is possible to improve the optical properties in the oblique direction and to provide wide-viewing angle properties. Moreover, the multi-peak fine protrusions present in the crest of the distribution having the lower height improve the anti-reflection function in the ultraviolet wavelength region, and the multi-peak fine protrusions present in the crest of the distribution having the larger height improve the anti-reflection function in the visible wavelength region. Thus, it is possible to further widen the wavelength band of the anti-reflection function.

Further, in order to secure the anti-reflection function in the infrared wavelength region, it is necessary to form mono-peak fine protrusions having a large arrangement interval (pitch) and a large height. In the antireflective article of the present embodiment, since the proportion of multi-peak fine protrusions present in the short fine protrusions is small, it is possible to prevent deterioration in the anti-reflection function in the infrared wavelength region due to the presence of multi-peak fine protrusions. Moreover, with such a configuration, even when another object makes frictional contact with the fine protrusions, the object makes first contact with the tall mono-peak fine protrusions and is prevented from making contact with the multi-peak fine protrusions.

[Fourth Embodiment]

Figure 19:
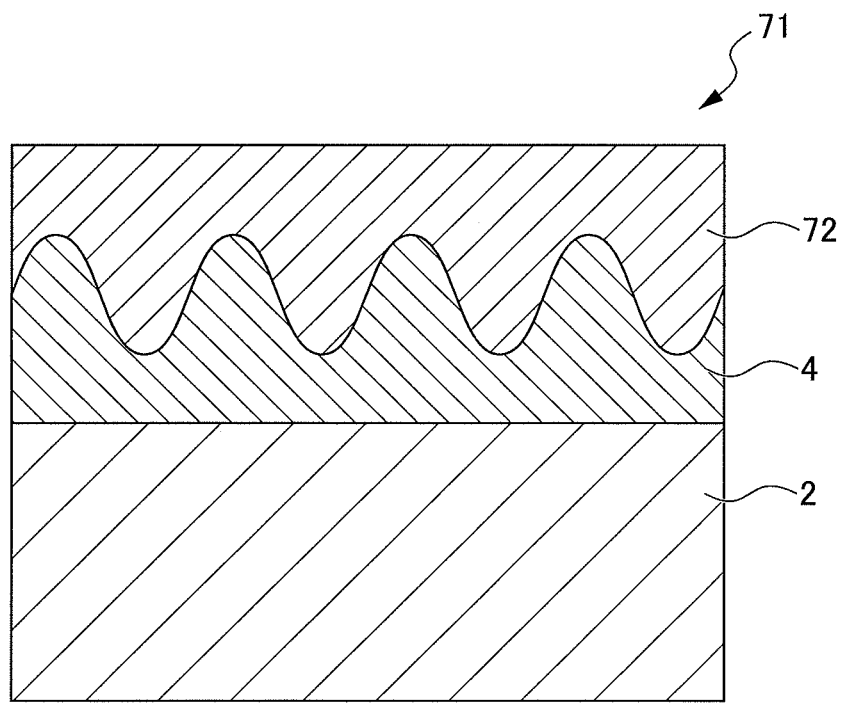
FIG. 19 is a diagram provided for describing an antireflective article according to a fourth embodiment.

FIG. 19 is a cross-sectional view illustrating an antireflective article according to a fourth embodiment of the present invention. This antireflective article 71 has a mold releasing agent 72 which is formed on a surface of the antireflective article 71 and of which the refractive index (close to the refractive index of air) is smaller than that of an ultraviolet-curable resin. The antireflective article 71 has the same configuration as that of the above-described embodiment except that the mold releasing agent 72 is formed.

In the present embodiment, the antireflective article 71 having the mold releasing agent 72 on the surface prevents scratches more effectively and prevents surface contaminations. That is, when a mold releasing agent is formed on a film material or the like, it is possible to prevent scratches and surface contaminations. However, if the mold releasing agent is removed, the film material may be damaged and the contamination preventing effect may decrease.

However, in the antireflective article according to the present embodiment, a number of fine protrusions are arranged closely to each other, and in particularly, some of these fine protrusions are multi-peak fine protrusions, and annular fine protrusion groups and convex protrusion groups having different protrusion heights are created. Thus, it is possible to suppress the possibility of the removal of the mold releasing agent remarkably and to provide the effect of preventing scratches and contaminations for a longer period than when a simple film material is used.

Here, examples of the mold releasing agent include various materials which can prevent surface scratches and contaminations such as silicon resins or fluorine resins. Moreover, the mold releasing agent can be arranged by various arrangement methods such as a method of attaching the mold releasing agent to a circumferential surface of a roll plate and transferring the mold releasing agent to an antireflective article to form the same on the antireflective article, a method of mixing the mold releasing agent into a molding resin layer to form the mold releasing agent on the antireflective article by beading-out the mold releasing agent, and a method of coating the surface of the antireflective article with the mold releasing agent.

In the present embodiment, by forming the mold releasing agent, it is possible to prevent scratches more effectively.

[Other Embodiments]

While the specific configuration of the embodiment of the present invention has been described in detail, the configuration of the above-described embodiment of the present invention may be modified into various forms without departing from the spirit of the present invention and can also be combined with the configuration of the related art.

That is, in the above-described embodiments, although a case where the anodization and the etching are repeatedly executed three (to five) times each has been described, the present invention is not limited to this, but the number of repetitions may be set to other numbers. Moreover, the present invention can be broadly applied to a case where, after the plurality of treatments are repeated, anodization may be performed as the final treatment.

Moreover, in the above-described embodiments, a case where the antireflective article is disposed on the front surface of various image display panels such as a liquid crystal display panel, an electroluminescent display panel, or a plasma display panel to improve the visibility has been described, the present invention is not limited to this. For example, the present invention can be broadly applied to a case where the antireflective article is disposed on the rear surface side of a liquid crystal display panel to suppress reflection loss of incident light from a backlight to the liquid crystal display panel (to increase the incident light utilization efficiency). Here, the front surface side of the image display panel is a light emission surface of the image light of the image display panel and the surface close to the image observer. Moreover, the rear surface side of the image display panel is the surface on the opposite side of the surface of the image display panel and is the light incidence surface of illumination light from the backlight when the image display device is a transmissive image display device which uses a backlight (back light source).

Moreover, in the above-described embodiments, although a case where an acrylate-based ultraviolet-curable resin is used as a molding resin has been described, the present invention is not limited to this but can be broadly applied to a case where various materials and various curable resins such as ultraviolet curable epoxy and polyester resins, electron-ray curable acrylate, epoxy, and polyester resins, or heat-thermosetting urethane, epoxy and polysiloxane resins are used. Moreover, the present invention can be broadly applied to a case where heated thermoplastic resins are pressed and molded.

Moreover, in the above-described embodiments, as illustrated in FIG. 1, the receiving layer (ultraviolet-curable resin layer) 4 is laminated on one surface of the base 2 to form a laminated structure, the fine protrusion groups 5, 5A, 5B, and the like are molded onto the receiving layer 4 of the laminated structure, and the receiving layer 4 is cured to form the antireflective article 1. This antireflective article 1 has a laminated structure having two layers. However, the present invention is not limited to this embodiment. Although not illustrated in the drawing, the antireflective article 1 of the present invention may have a single-layer structure in which the fine protrusion groups 5, 5A, 5B, and the like are molded directly on one surface of the base 2 with no layer interposed. Alternatively, the antireflective article 1 may have a laminated structure including at least three layers in which the receiving layer 4 is formed on one surface of the base 2 with at least one intermediate layer (a layer which improves surface performance such as inter-layer adhesion, coating properties, or surface smoothness, and which is also referred to a primary layer or an anchor layer) interposed and the fine protrusion groups 5, 5A, 5B, and the like are molded on the surface of the receiving layer.

Further, in the above-described embodiment, as illustrated in FIG. 1, although the fine protrusion groups 5, 5A, 5B, and the like are formed on only one surface of the base 2 (directly or with another layer interposed), the present invention is not limited to this embodiment. The fine protrusion groups 5, 5A, 5B, and the like may be formed on both surfaces of the base 2 (directly or with another layer interposed).

Moreover, although not illustrated in the drawing, the antireflective article 1 of the present invention as illustrated in FIG. 1 and other drawings may be formed as an adhesive article in which an optional adhesive layer is formed on the surface (the lower surface of the base 2 in FIG. 1) opposite to the fine protrusion group formation surface of the base 2 and a release film (release paper) is separably laminated on the surface of the adhesive layer. In such an embodiment, the antireflective article 1 of the present invention may be attached and laminated onto a desired surface of a desired article by the adhesive layer after separating the release film so as to expose the adhesive layer. In this way, the desired article can be provided with an anti-reflection performance. As the adhesive, various existing adhesives such as an adhesive (pressure-sensitive adhesive), a two-pack curable adhesive, an ultraviolet-curable adhesive, a thermosetting adhesive, a hot-melt adhesive, and the like, may be used.

Furthermore, although not illustrated in the drawing, the antireflective article 1 of the present invention as illustrated in FIG. 1 and other drawings may be stored, transported, sold, post-processed, and used in a state where a separable protection film is temporarily attached onto the formation surface of the fine protrusion groups 5, 5A, 5B, and the like, and the protection film may be removed at an appropriate time later on. In such an embodiment, it is possible to prevent deterioration in the anti-reflection performance due to the damage or contamination of the fine protrusion groups during storage and transportation.

Moreover, in the above-described embodiment, as illustrated in FIG. 1 and FIG. 10A, although the plane that connects the trough bottoms (minimum height points) between respective adjacent fine protrusions is a flat surface having a constant height, the present invention is not limited to this. As illustrated in FIGS. 12A to 12C, the envelope surface that connects the trough bottoms between fine protrusions may undulate with a period D (D>λmax) no less than the longest wavelength λmax of the visible wavelength band. Moreover, the periodic undulation may appear in only one direction (for example, the X-direction) of the XY plane (see FIGS. 10A to 10C and FIGS. 12A to 12C) parallel to the front and rear surface of the base 2 and may have a constant height in the direction (for example, the Y-direction) orthogonal to the one direction. Alternatively, the periodic undulation may appear in both two directions (the X and Y directions) of the XY plane. When the uneven surface 6 undulating with the period D satisfying the relation of D>λmax overlaps with a fine protrusion group made up of a number of fine protrusions, it is possible to scatter the remaining light of which the reflection has not been prevented by the fine protrusion group to make the remaining reflection light and in particular mirror reflection light harder to be visible. As a result, it is possible to further improve the anti-reflection effect.

When the period D of the uneven surface 6 is not constant over the entire surface but has a certain distribution, a frequency distribution of the inter-convex portion distance on the uneven surface is calculated. When an average of the inter-convex portion distance is $D_{AVG}$ and the standard deviation is $\Sigma$, a smallest inter-adjacent protrusion distance is defined as follows.

$$D_{MIN} = D_{AVG} - 2\Sigma$$

The smallest advertisement distribution apparatus is used as the period D. That is, the condition for the fine protrusion groups to provide a sufficient effect of scattering remaining reflection light is as follows.

$$D_{MIN} > \lambda\max$$

In general, D or $D_{MIN}$ is set to 1 μm to 200 μm, and preferably, 10 μm to 100 μm.

An example of a specific production method for forming fine protrusion groups in which an envelope surface that connects the trough bottoms of fine protrusions has the uneven surface 6 satisfying the relation of D (or $D_{MIN}$)>λmax will be described below. That is, in the step of producing the roll plate 13, a relief shape corresponding to the relief shape of the uneven surface 6 is molded to the surface of a cylindrical (or columnar) base member using sand-blasting or matte (delustering) plating. Subsequently, an aluminum layer is laminated onto the surface of the relief shape directly or after forming an appropriate intermediate layer as necessary. After that, anodization and etching are performed on the aluminum layer to which the surface shape corresponding to the relief shape is molded in the same manner as the above-described embodiments to form a fine protrusion group including the fine protrusions 5, 5A, and 5B.

Further, in the above-described embodiments, although a case where a molding mold is produced by repeating anodization and etching has been described, the present invention is not limited to this but can be broadly applied to a case where the molding mold is produced using a photolithography technique.

Moreover, in the above-described embodiments, although a case where a film-shaped antireflective article is produced by molding using a roll plate has been described, the present invention is not limited to this. For example, an antireflective article may be created by sheet processing using a molding mold having a specific curved shape, for example, depending on the shape of a transparent base associated with the shape of the antireflective article. That is, the step and the mold for the molding treatment can be appropriately changed depending on the shape of the transparent base associated with the shape of the antireflective article.

Furthermore, in the above-described embodiments, although a case where a film-shaped antireflective article is disposed on the front surface of an image display panel or an incidence surface of illumination light has been described, the present invention is not limited to this but can be applied to various applications. Specifically, the antireflective article may be applied to an application in which the antireflective article is disposed on the rear surface (the image display panel side) of a front-surface-side member such as a touch panel provided on the screen of an image display panel with a gap therebetween, various windows, or various optical filters. In this case, it is possible to provide an effect that an interference pattern such as the Newton ring caused by the interference of light between the image display panel and the surface-side member is prevented, a ghost image caused by the multi-reflection between the emission surface of the image display panel and the light incidence surface of the surface-side member is prevented, and the reflection loss of the image light emitted from the screen and entering the surface-side member is suppressed.

Alternatively, as a transparent electrode that constitutes the touch panel, an electrode obtained by forming the fine protrusion group unique to the present invention on a film-shaped or planar transparent base and forming a transparent conductive film such as indium tin oxides (ITO) on the fine protrusion group can be used. In this case, it is possible to provide an effect that optical reflection between the touch panel electrode and an adjacent facing electrode or various members is prevented and the occurrence of interference patterns or ghost images is suppressed.

Further, the antireflective article may be disposed on the front surface (the outer side) or both the front surface and the rear surface (the goods or exhibited object side) of a glass plate used in a show window, a goods display box of a shop, a display window, a goods display box for an exhibited object in a museum, or the like. In this case, it is possible to improve the visibility of an art collection or goods for a tourist or a customer with the help of the anti-light-reflection function of the front surface of the glass plate.

Moreover, the antireflective article may be widely used for the cases where the antireflective article is disposed on the front surface of a prism or a lens used in various optical units such as glasses, a telescope, a camera, a video camera, a gun's sight mirror (sniper's scope), binocular glasses, a periscope, and the like. In this case, it is possible to improve the visibility with the help of the anti-light-reflection function of the front surface of the lens or the prism. Furthermore, the antireflective article may be applied to the case where the antireflective article is disposed on the front surface of a printed portion (including characters, pictures, diagrams and the like) of a book so as to prevent the light reflection on the front surface of the characters and the like to improve the visibility of characters and the like. Furthermore, the antireflective article may be disposed on the front surface of a signboard, a poster, and various displays (a direction guide, a map, a no smoking sign, an entrance sign, an emergency exit sign, a restricted area sign, or the like) in various shops, streets, outer walls, and the like so as to improve the visibility thereof. Furthermore, the antireflective article may be disposed on the light incidence surface side of a window material (also serving as a diffuser plate, a light collecting lens, or an optical filter in some cases) of an illumination unit which uses a white bulb, a light emitting diode, a fluorescent lamp, a mercury lamp, EL (electroluminescence) lamp, or the like so as to prevent the light reflection of the light incidence surface of the window material to reduce the reflection loss of the light from the light source and improve the light utilization efficiency. Furthermore, the antireflective article may be disposed on the display window surface (the display observer side) of a clock or various measurement units so as to prevent the light reflection of the display window surface to improve the visibility.

Furthermore, the antireflective article may be disposed on the front surface of the indoor side, the outdoor side, or both sides of a control cabin (an operation cabin or a steering cabin) of a vehicle such as an automobile, a railroad vehicle, a ship, or an airplane so as to prevent reflection of the indoor external light from the window to improve the visibility of the controller (the operator or a steering person) to the external world. Furthermore, the antireflective article may be disposed on the front surface of a window or a lens of a night-vision device used for a security monitoring operation, the focusing operation of a gun, an astronomical observing operation, or the like so as to improve the visibility at night time or in dark places.

Furthermore, the antireflective article may be disposed on the front surface (the indoor side, the outdoor side, or both sides) of a transparent substrate (a window glass or the like) that forms a window, a door, a partition, or a wall surface of a building such as a house, a shop, an office, a school, a hospital, or the like so as to improve external world visibility or lighting efficiency. Furthermore, the antireflective article may be disposed on the front surface of a transparent sheet or a transparent plate (window material) of a greenhouse or an agricultural vinyl greenhouse so s to improve the lighting efficiency of the sunlight. Furthermore, the antireflective article may also be applied onto the front surface of a solar cell, and may improve the utilization efficiency (generation efficiency) of sunlight.

Furthermore, in the above-described embodiments, although the wavelength band of electromagnetic waves of which reflections are to be prevented is set to (the entire region or a partial region of) the visible wavelength band, the present invention is not limited to this, the wavelength band of electromagnetic waves of which reflections are to be prevented may be set to other wavelength bands such as an infrared wavelength band or an ultraviolet wavelength band other than the visible wavelength band. In this case, in the respective conditional expressions, the shortest wavelength $\Lambda$min of the wavelength band of electromagnetic waves may be set to the shortest wavelength in which an anti-reflection effect is to be achieved, of the wavelength band such as an infrared wavelength band or an ultraviolet wavelength band. For example, when it is desired to realize anti-reflection in an infrared wavelength band of which the shortest wavelength $\Lambda$min is 850 nm, the inter-adjacent protrusion distance d (or the maximum value dmax) may be designed to 850 nm or smaller (for example, d(dmax)=800 nm). In this case, it is possible to obtain an antireflective article which does not provide the anti-reflection effect in the visible wavelength band (380 nm to 780 nm) but provides the anti-reflection effect in infrared rays having the wavelength of 850 nm or more.

In the above-described various embodiments, when the film-shaped antireflective article of the present invention is disposed on the front surface, the rear surface, or both surfaces of the transparent substrate such as a glass plate, the antireflective article may be disposed on only a partial region instead of disposing or coating the same on the entire surface of the transparent substrate. As such an example, for example, the film-shaped antireflective article may be applied to only the indoor side surface in a square region of a center portion of one window glass and may not be applied to other regions. When the antireflective article is disposed on only a partial region of the transparent substrate, it is easy to visually recognize the presence of the transparent substrate even when a particular display or a collision prevention object is not provided. Accordingly, it is possible to provide an effect of suppressing the risk of a person being injured by colliding with the transparent substrate and an effect of preventing an indoor (interior) visible state and realizing a visible state (in the region where the antireflective article is disposed) of the transparent substrate.

The invention claimed is:

1. An antireflective article in which fine protrusions are disposed closely to each other such that an interval between peaks of any two adjacent fine protrusions is no more than a shortest wavelength in a visible light wavelength band of between 380 nm and 780 nm of which reflections are to be prevented, wherein
at least one of the fine protrusions is a multi-peak fine protrusion such that each multi-peak fine protrusion is formed by splitting a peak of the at least one of the fine protrusions into a plurality of peaks but no peaks are formed in trough portions between peaks of any two adjacent fine protrusions.

2. The antireflective article according to claim 1, wherein the fine protrusions have heights which vary in a standard deviation range of 10 nm or more and 50 nm or smaller.

3. The antireflective article according to claim 1, wherein when the fine protrusions are seen in a plan view from a distal end side, the multi-peak fine protrusion is split into a plurality of regions by a groove formed so as to extend outward approximately from the center of the multi-peak fine protrusion, and each of the plurality of regions is a crest associated with the peaks.

4. The antireflective article according to claim 1, wherein a circumferential length of the multi-peak fine protrusion when the fine protrusions are seen in a plan view from a distal end side is larger than that of a mono-peak fine protrusion.

5. The antireflective article according to claim 1, wherein at least a portion of the fine protrusions forms an annular fine protrusion group which includes an inner fine protrusion and a plurality of outer fine protrusions which surround the inner fine protrusion and have a larger height than the inner fine protrusion.

6. The antireflective article according to claim 1, wherein at least a portion of the fine protrusions forms a convex protrusion group which includes one apex fine protrusion and a plurality of surrounding fine protrusions which is formed around and adjacent to the apex fine protrusion and has a smaller height than the apex fine protrusion.

7. The antireflective article according to claim 1, wherein a frequency distribution of a height of the fine protrusions has a crest of a distribution having one apex, and
a larger number of the multi-peak protrusions are present near the apex than a skirt portion of the crest of the distribution.

8. The antireflective article according to claim 7, wherein when an average of a height h in the frequency distribution of the height h of the fine protrusions is m and a standard deviation is $\sigma$,
a region of $h<m-\sigma$ is defined as a low-height region,
a region of $m-\sigma \leq h \leq m+\sigma$ is defined as a mid-height region, and
a region of $m+\sigma<h$ is defined as a high-height region,
a ratio of the number Nm of multi-peak fine protrusions in respective regions to a total number Nt of fine protrusions in the entire frequency distribution satisfies relations of:
Nm/Nt in the mid-height region>Nm/Nt in the low-height region; and
Nm/Nt in the mid-height region>Nm/Nt in the high-height region.

9. The antireflective article according to claim 1, wherein a frequency distribution of a height of the fine protrusions includes a plurality of crests of distributions, and
a larger number of the multi-peak protrusions is present near an apex than a skirt portion of the crest of each distribution.

10. The antireflective article according to claim 9, wherein
the frequency distribution of a height h of the fine protrusions has a double-peak distribution,
when a height serving as a boundary between the crests of the distribution is hs, an average of the height h of the fine protrusions in the crest of a distribution smaller than hs is m1, and a standard deviation is $\sigma 1$,
a region of $h<m1-\sigma 1$ is defined as a low-height region,
a region of $m1-\sigma 1 \leq h \leq m1+\sigma 1$ is defined as a mid-height region, and
a region of $m1+\sigma 1<h<hs$ is defined as a high-height region,
a ratio of the number Nm1 of multi-peak protrusions in the respective regions of the crest of the distribution smaller than hs to a total number Nt of fine protrusions in the entire frequency distribution satisfies relations of:
Nm1/Nt in the mid-height region>Nm1/Nt in the low-height region; and
Nm1/Nt in the mid-height region>Nm1/Nt in the high-height region, and
when an average of the height h of the fine protrusions in the crest of a distribution of hs or more is m2 and a standard deviation is $\sigma 2$,
a region of $hs<h<m2-\sigma 2$ is defined as a low-height region,
a region of $m2-\sigma 2 \leq h \leq m2+\sigma 2$ is defined as a mid-height region, and
a region of $m2+\sigma 2<h$ is defined as a high-height region,
a ratio of the number Nm2 of multi-peak protrusions in respective regions of the crest of the distribution of hs or more to a total number Nt of fine protrusions in the entire frequency distribution satisfies relations of:
Nm2/Nt in the mid-height region>Nm2/Nt in the low-height region; and
Nm2/Nt in the mid-height region>Nm2/Nt in the high-height region.

11. The antireflective article according to claim 9, wherein when an average of a height h in the frequency distribution of the height h of the fine protrusions is m and a standard deviation is $\sigma$,
a region of $h<m-\sigma$ is defined as a low-height region,
a region of $m-\sigma \leq h \leq m+\sigma$ is defined as a mid-height region, and
a region of $m+\sigma<h$ is defined as a high-height region,
a ratio of the number Nm of multi-peak protrusions in respective regions to a total number Nt of fine protrusions in the entire frequency distribution satisfies relations of:
Nm/Nt in the mid-height region>Nm/Nt in the low-height region; and
Nm/Nt in the mid-height region>Nm/Nt in the high-height region.

12. An image display device in which the antireflective article according to claim 1 is disposed on a light emission surface of an image display panel.

13. An antireflective article production mold provided for producing an antireflective article in which, fine protrusions are disposed closely to each other such that an interval between peaks of any two adjacent fine protrusions is no more than a shortest wavelength in a visible light wavelength band of between 380 nm and 780 nm of which reflections are to be prevented, and at least one of the fine protrusions is a multi-peak fine protrusion such that each multi-peak fine protrusion is formed by splitting a peak of the at least one of the fine protrusions into a plurality of peaks but no peaks are formed in trough portions between peaks of any two adjacent fine protrusions, wherein the antireflective article production mold is produced so that micro-pores corresponding to the fine protrusions are arranged closely to each other.

14. A production method for producing the antireflective article production mold according to claim 13, the method comprising:

a flat micro-pore forming step of applying a first voltage to execute anodization and then executing etching to form micro-pores having an approximately flat bottom surface on a surface of a plate; and a multi-peak protrusion micro-pore forming step of applying a second voltage lower than the first voltage to execute anodization and then executing etching to form a plurality of micro-pores on the bottom surface of the micro-pores having the approximately flat bottom surface.

* * * * *